United States Patent [19]
Beausoleil et al.

[11] 3,766,534
[45] Oct. 16, 1973

[54] SHIFT REGISTER STORAGE UNIT WITH MULTI-DIMENSIONAL DYNAMIC ORDERING

[75] Inventors: William F. Beausoleil, Hopewell Junction; Byron E. Phelps, Poughkeepsie, both of N.Y.

[73] Assignee: International Business Machines Corporation, Armonk, N.Y.

[22] Filed: Nov. 15, 1972

[21] Appl. No.: 306,952

[52] U.S. Cl. ...... 340/172.5, 307/221 R, 340/174 SR
[51] Int. Cl. ...... G11c 19/00
[58] Field of Search ...... 340/172.5, 174 SR; 328/37; 307/221 R

[56] References Cited

UNITED STATES PATENTS

| | | | |
|---|---|---|---|
| 3,670,313 | 6/1972 | Beausoleil et al. | 340/174 SR X |
| 3,704,452 | 11/1972 | Beausoleil et al. | 340/172.5 |

*Primary Examiner*—Paul J. Henon
*Assistant Examiner*—Melvin B. Chapnick
*Attorney*—W. N. Barret, Jr. et al.

[57] ABSTRACT

A data storage unit in which words of data including the word addresses are stored in groups of shiftable matrices, the groups of matrices being operable on a signal requesting access to repetitively shift their contents to other matrix positions in various loops, some of which include a position from which a word may be accessed and some of which exclude the access position. The bits in a data word are distributed among groups of matrices, each group generally containing only one bit of a given word. Each group is logically divided into a plurality of sectors, with each sector containing bits from several words. Controls are provided for varying the shifting in the various loops such that the positions of some or all of the sectors are dynamically reordered so that the proximity of each of the sectors to the access position is approximately or exactly the order in which the sectors were last requested, and so that the word bits within the sectors are also positioned so that their proximity to the access position is approximately or exactly the order in which they were last requested, thus reducing average access time in programs involving considerable repeated reference to a limited group of sectors and/or words in the memory, and substantially reducing worst-case access time for all situations.

25 Claims, 9 Drawing Figures

SHIFT REGISTER STORAGE UNIT WITH MULTI-DIMENSIONAL DYNAMIC ORDERING

INTRODUCTION

BACKGROUND OF THE INVENTION

The invention relates to shiftable matrices and controls for data storage, particularly such storage in memories which are addressed in response to computer programs.

Shift register storage has certain advantages over fixed position (directly addressable) storage such as greater simplicity and lower cost of the hardware, compactness, and lack of noise problems inherent in coincident current accessing of fixed position storage. However, since words in a shift register storage are generally stored in a fixed succession, and each requested word may be anywhere in the succession, the average access time is quite long, being half the number of shifts required to move to the access position the page that is most remote therefrom.

Average access time within the shift register memory is substantially improved by the invention described in application Ser. No. 103,201, now U.S. Pat. No. 3,704,452 for SHIFT REGISTER STORAGE UNIT filed on Dec. 30, 1970 by W. F. Beausoleil et al. assigned to the same assignee as this application. That application describes a shift register memory wherein the various words are dynamically reordered as they are used so that the most recently used words are maintained in closer proximity to the access position of the storage than are less recently used words. Since requests for access to data storage are usually on an ordered rather than a random basis, and there is a high probability in an ordered system (such as a computer program) of frequent repetitive requests for access to certain words in a given class or in congruent classes, this invention provides a substantial reduction in average memory access time in most situations. However, despite the improved average access time, the dynamic ordering described in said application does not improve worst-case access time. Also, the system described in the co-pending application provides no means for taking advantage of the fact that, in many ordered systems, there is a high probability that a reference to a memory word of one type will shortly be followed by references to other related words.

Some of the objects of this invention are: to reduce the average access time in a shiftable memory;

to reduce the worst-case access time in such a memory;

to provide a memory which accomplishes the above objectives while still retaining the spacial relationship within the memory of "pages" of related words; and to facilitate the practical use of large capacity shiftable memories.

SUMMARY OF THE INVENTION

The above and other objects are accomplished in accordance with one preferred embodiment of this invention by providing a shifting memory wherein the bits of a word are distributed among rectangular (two-dimensional) matrices instead of among linear (one-dimensional) shift registers. Each memory cell in the matrix may be shifted vertically in one or more shift loops, and at least one group of cells may also be shifted horizontally in one or more shift loops. Each horizontal row of bits in a matrix may be regarded as a sector or page. When a given word is requested from the memory, the rows are shifted downward (with the bottom row wrapping around to the top) until the sector which contains the desired word is on the bottom row of the matrix. The bits on the bottom rows of the matrices are then shifted toward the access position (again with wrap around, so that no data is lost) until the bits of the desired word are at the various access positions and the word can be read from (or a new word written into) the memory. After (or in some cases, while) the desired word is accessed, the words in the sector will be dynamically reordered in sequence of most recent usage. Also, the sectors themselves will be dynamically reordered. Thus, after many accesses to the memory, the distance of the various sectors from the bottom (output) row of the matrix will be in order of their recency of usage and the distance from the access position of the bits in each sector will also be in order of recency of usage.

In accordance with another embodiment of the invention, the sector or page approach is not used. Instead, each data word is treated as if it had no logical relationship to adjacent words in the memory. In this embodiment, after the rows of the matrix are shifted downward until the bits of the desired word are in the bottom rows of the matrices, the bottom rows are shifted toward the access position in order that the desired word may be accessed, the bottom rows are dynamically reordered, and then all bits, except those which comprise the accessed word, that were in the row which originally contained the access word are returned to the row from which they came in the matrix. As compared with the first preferred embodiment, the most significant disadvantage of the second embodiment is that it is more complex and expensive to implement because it will generally require more circuitry. Also, in most word systems it will be disadvantageous (in terms of average access time) to destroy the integrity of a "page" as is done in this embodiment. However, if one were dealing with a system wherein there were no definable relationship between various words of data, or in which the relationships could not be defined at the time that the memory is loaded, then this second embodiment could possibly offer enough of an improvement in average access time to justify its additional cost.

Perhaps the clearest advantage of this invention is its improvement of worst-case access time in a shifting type memory. If an n-word memory is implemented with linear (one-dimensional) shift registers, it will take $(n-1)$ shifts to access the farthest word. With this invention, if the n-word memory is implemented using square matrices, the worst-case access time becomes $2(\sqrt{n}-1)$. The preferred embodiment described herein is a memory containing 16,384 words. Using the prior art approach described above, worst-case access would require 16,383 shifts; using this invention with a square (128 × 128) matrix, worst-case access requires 254 shifts. This advantage of the invention leads directly to the further advantage of making it more practical to build very large memory units of the shifting type. If one of the requirements in a given memory application were that the worst-case access could be no more than $s$ shifts, the prior art described above would have to be implemented with linear shift registers no longer than $s + 1$; but implementing this invention with a square matrix would permit one to make each memory unit contain $[(s/2)+1]^2$ words. Of course, the ability to use larger memory units yields the further advantage that, for a memory system of a given size, the total system will contain fewer access positions. Since the memory cells which comprise the access positions generally require more circuitry than do the other cells, a large memory built in accordance with this invention could actually cost less than a similar prior art memory.

Still another advantage of the invention is its reduction in average access time. The ability of this memory to shift both vertically and horizontally within the matrix results in a larger number of bits being within a given number of shifts of the access position. For example, in the rectangular matrix there are 66 words (including the word that is at the access position) that are within 10 shifts of the access position; in the prior art, only 11 words would be within the 10-shift range. Still another advantage of the first emgodiment of the invention that further contributes to lower average access times is the maintenance of the integrity of "pages." Since, in many ordered systems, a reference to one word in a given page will shortly be followed by other references to words in that page, average access time will generally be improved by the page ordering which is provided by this invention.

The above and other objects, features and advantages of the invention will be apparent from the following more particular description of preferred embodiments of the invention as illustrated in the accompanying drawings.

DETAILED DESCRIPTION

Memory Module

Figure 1:
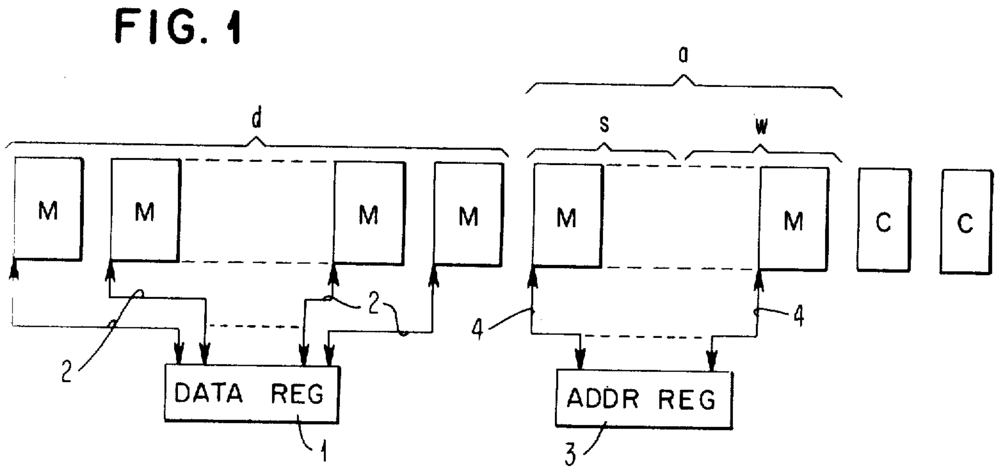
FIG. 1 is a diagrammatic layout explanatory of the arrangement of shifting storage matrices according to one embodiment of the invention.

FIG. 1 shows diagrammatically a memory module that may be constructed in accordance with this invention. A memory system may contain a plurality of such modules. The module comprises a group of rectangular storage matrices M each of which contains n storage cells. Words are distributed throughout the memory module in such a manner that each bit of any given word is stored in a separate matrix M. Thus, if each word contains *d* bits of data, *d* matrices are used to store the data bits. In each matrix there is one storage cell through which the memory is accessed (for either reading or writing). In order that all of the bits of any given word may be accessed from the memory, each matrix is capable of shifting data both vertically and horizontally so that, by performing appropriate shifts, each bit in each matrix may be accessed via the access cell. In the memory organization depicted in FIG. 1, the access cell is in the lower left-hand corner of each matrix. Data may be read from the memory into data register 1 (or written into the memory therefrom) via read/write lines 2 which connect the matrices to the data register. Since the location of a given word of data within the memory module will frequently change, each word carries its own address with it. The *a* address bits which identify a given word are contained in *a* matrices each of which is preferably identical with the *d* matrices which contain the data bits. The *a* matrices containing the address bits feed an address register 3 via read/write lines 4 which are connected to the access cells of these matrices. For reasons which will become clear hereinafter, the *a* address bits are subdivided into *s* sector bits and *w* word bits. The reason that lines 4 have been described as read/write lines (instead of merely as read lines) is that, when the memory is initially loaded, addresses will be written into the matrices along with the associated data.

All of the bits (data bits and address bits) which comprise a given word are preferably located at identical positions in the various matrices. Thus, when the matrices are shifted in synchronism, all of the bits of any given word will be accessible at the same time.

Each memory module may also have associated with it two counters C which may be utilized, in dynamic reordering, to keep track of vertical and horizontal shifts. The counters may consist of two linear shift registers. One of the counter registers would be equal in size to the vertical dimension of the matrices M; the other counter register would be equal in size to the horizontal dimension of the matrices M.

MEMORY MATRIX

Figure 2:
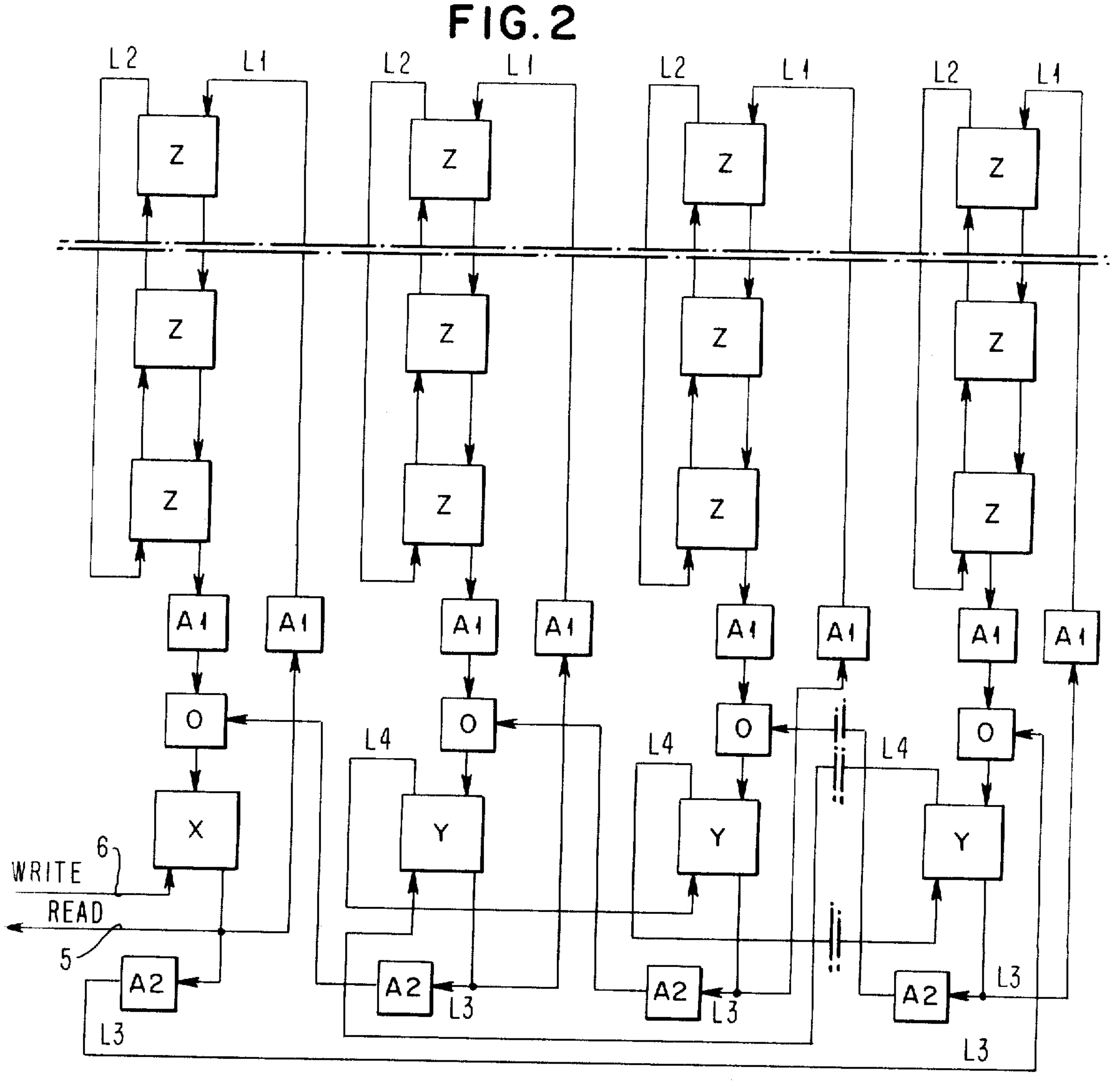
FIG. 2 is a diagrammatic layout showing more details of a first embodiment of a storage matrix.

FIG. 2 illustrates the manner in which words are accessed by shifting within the matrices in accordance with a preferred embodiment of the invention. Since, in the preferred embodiment, all of the matrices are identical and they are all shifted in unison, it is sufficient to show only one matrix. In FIG. 2, the access (input/output) cell is designated X, the other cells on the bottom row of the matrix are designated Y, and all remaining cells are designated Z. As shown in FIG. 2, the matrix may shift data among the cells in four distinct shift loops: in each column, data may be shifted downward in loop L1, which includes all of the memory cells in the column, with data from the bottom cell wrapping up to the top cell; in each column data may be shifted upward in loop L2, which includes all cells in the column except the bottom memory cell, with data from the top cell wrapping around to the second cell from the bottom (the lowest Z cell); in the bottom row of the matrix, data may be shifted to the left through loop L3, which includes all of the cells (access cell X and cells Y) of the bottom row, with data from cell X wrapping around to the rightmost Y cell (in the drawing, loop L3 goes through the OR circuit 0 which is at the upper right of each cell in the bottom row, through the cell and out the lower right portion through AND circuit A2, and to the next OR circuit); and, again in the bottom row, there is loop L4, including all of the memory cells in the bottom row except the access cell X, in which data is shifted to the right with data from the rightmost cell wrapping around to the leftmost Y cell.

In order to achieve memory access and to perform dynamic ordering, the matrix shown in FIG. 2 (and the other matrices which are operated in unison) operates as follows:

1. Upon receipt of a request for a memory access, AND gates A1 will be energized and each column of the matrix will shift downward in loop L1 until the requested word is in the bottom row of the matrix (in cell X or in one of the cells Y).
2. Then AND gates A2 will be enabled and the data will be shifted to the left in loop L3 until the desired data is in the access cell X. At this time, the data may be read from the memory on line 5 or new data may be written into the memory on line 6.
3. The data in the bottom row of the matrix will then be shifted to the right in loop L4 (comprising all of the bottom row except the access cell). The number of right shifts in loop L4 will be exactly identical to the number of left shifts in loop L3 that were required to bring the desired data into the access cell.
4. The data in cells Z in each column of the matrix will be shifted upward in loop L2. The number of upward shifts in loop L2 will be exactly identical to the number of downward shifts in loop L1 that were required to bring the desired data to the bottom row of the matrix. In the preferred embodiment of the invention, this last step is done in parallel with step 3 above.

If, at the time of the memory access request, the desired data is already in cell X, none of the above steps will need to be executed; if, at the time of the memory request, the data is in one of the cells Y, then steps 1 and 4 would be eliminated; or if, after the execution of step 1, the desired data is found to be in cell X, then steps 2 and 3 would be eliminated.

Thus, each time that a word is accessed from a row which was not the lowest row in the matrix at the time of the access request, the rows are reordered to the extent that the row from which a word was accessed will be at the bottom of the matrix and all rows that had previously been closer to the bottom will have been moved up one position. Also, each time that a word other than the leftmost word in a row is accessed, the words in that row will be reordered to the extent that the accessed word will become the leftmost word and all words that had been to the left of the accessed word will be moved to the right one position. Thus at any given time, regardless of how they were originally ordered, all rows from which a word has been accessed are reordered in the direction of shifts of loop L1, in terms of recency of access, from the newest in the bottom row to the oldest in the uppermost row; and within each row all words that have been accessed are reordered in the direction of shift of loop L3, in terms of recency of access, from the newest in the leftmost position to the oldest in the rightmost position.

Memory Cell

Figure 3:
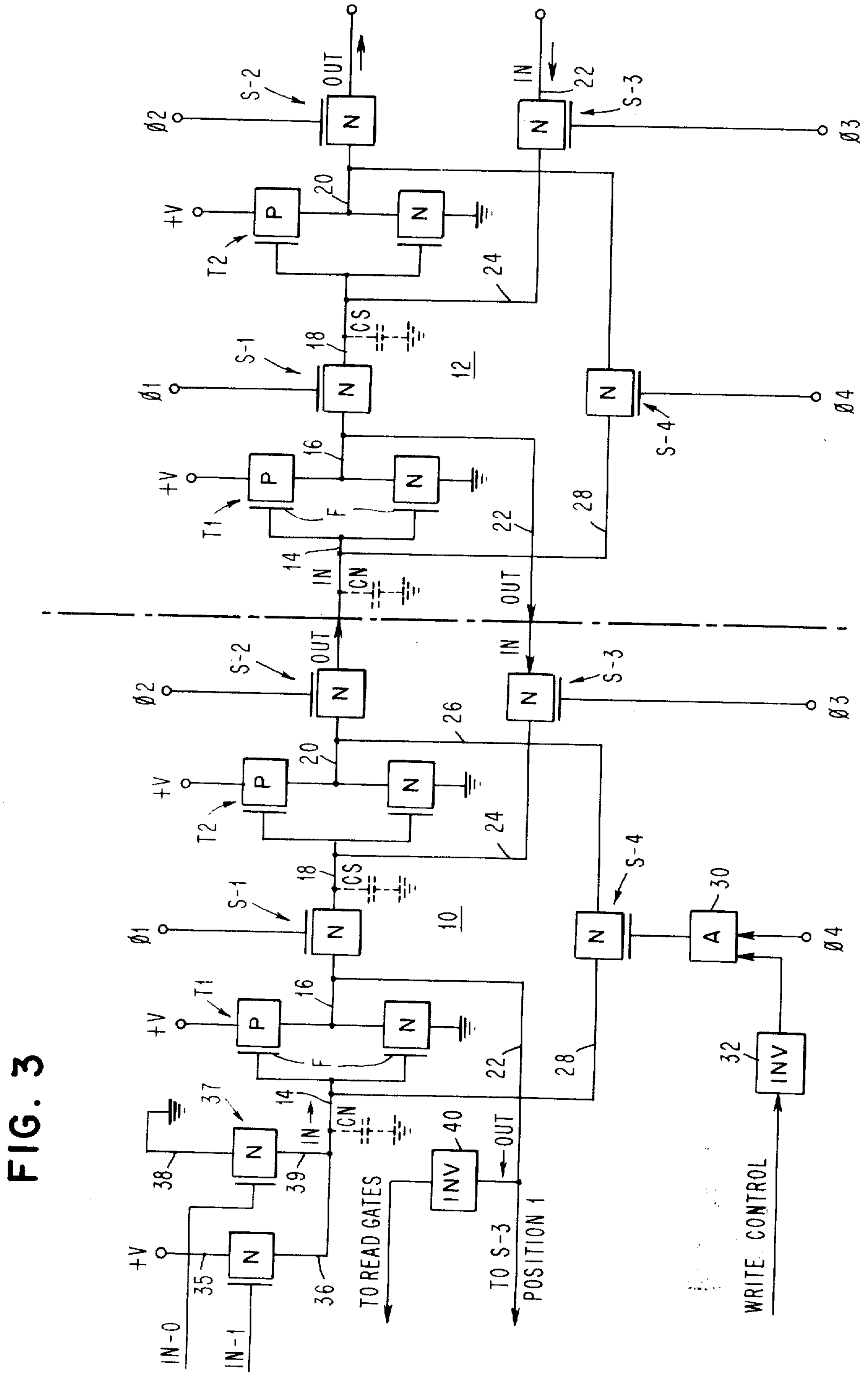
FIG. 3 illustrates the circuitry of memory cells which may be used in the invention.

Referring to FIG. 3, details are shown of memory cells that may be used in implementing this invention. The cells shown in FIG. 3 are two positions of what is commonly known as a "Two-Way Static Four-Phase MOSFET Shift Register." Cell 12 which appears to the right of the dashed operation line in FIG. 3 may be utilized for cells Y and cells Z shown in FIG. 2. Cell 10, which is shown to the left of the dashed separation line in FIG. 3, differs from cell 12 in that it contains appropriate circuitry for reading and writing of data. Thus, cell 10 will be suitable for use as cell X (the "access" or input/output cell) of FIG. 2. The two cells are shown together in FIG. 3 primarily to illustrate the manner in which data may be shifted within the storage matrix.

In each cell of FIG. 3, pulse values of 1 or 0 are received and stored in a capacitance labeled "CN" which is indicated in dotted lines since it will usually be only the capacitance between an input line 14 and ground. Line 14 is connected to the field plates F of a complementary field effect transistor T-1 which has a p-channel conductor P connected to a source of positive voltage +V and an n-channel conductor N connected between conductor P and ground. A line 16 has one end thereof connected to the circuit between conductors P and N. Transistor N-1 operates in the usual manner to produce in line 16 the invert of the charge on line 14. This is because a positive charge applied by line 14 to the plates F of the transistor renders conductor N relatively freely conductive and conductor P relatively non-conductive so that line 16 goes essentially to ground potential. Conversely, a zero or negative charge on line 14 renders conductor P relatively freely conductive and conductor N relatively non-conductive so that line 16 goes essentially to the positive potential applied across conductor P. Transistor T-1 serves to isolate electrically line 14 from line 16 and to inhibit decay of the potential on 14.

Line 16 is connected to a line 18 through a field effect transistor having a single n-channel conductor N which is rendered conductive to shift the potential on line 16 to line 18 by the first phase (0 1) of a four phase positive shift pulse train applied to its plate. This transistor therefore functions simply as a switch and is designated S-1. The potential shifted to line 18 is stored in a capacitor CS, which again is indicated in dotted lines as it may simply be the capacitance between the line and ground. Line 18 is connected to the plates of a transistor T-2 which is the same as transistor T-1, connected in the same way, so that the potential on line 18 appears inverted on a line 20 connected as the line 16. Therefore, line 20 receives a potential corresponding to that originally applied to input line 14. On a right shift in FIG. 3, the potential on line 20 is shifted to a line marked OUT, connected to the input line 14 of the next cell 12, by the phase 2 pulse applied to transistor switch S-2 which is the same as switch S-1.

For shifting left in FIG. 3 a line 22 is connected to line 18 of cell 12 and through switch S-3 of cell 10 to line 18 of cell 10. A phase 3 pulse applied to transistor S-3 therefore shifts to line 18 of cell 10 the potential on line 16 of cell 12, which by virtue of transistor T-1 of cell 12, is the invert of the potential on its line 14. The potential shifted to line 18 is inverted on line 20 of cell 10 by its transistor T-2 and therefore the potential on line 20 of cell 10 corresponds to that on the input line 14 of cell 12. This potential on line 20 of cell 10 is shifted to input line 14 thereof via line 26 connected to said line 20, transistor switch S-4 of cell 10, and line 28 connecting transistor S-4 to input line 14 of cell 10, by a phase 4 pulse applied to switch S-4.

It will be apparent from the foregoing that each cell can be operated as a static storage device by alternately pulsing its S-1 and S-4 switches without pulsing S-2 and S-3. The pulse on S-1 causes line 20 to be at a potential corresponding to that of line 14 which is shifted back to line 14 to maintain the stored potential, by the pulse applied to switch S-4.

Data may be read into any cells by applying the corresponding potential to the input line 14 thereof, while neither of switches S-2 and S-4 is operating to cause a possible conflict of potentials applied to line 14. Data may also be read out from any data cell from line 16 via output line 22 at any time switches S-2 and S-4 are not operating and also while the cell is in the static condition with only switches S-1 and S-4 operating in alternation.

FIG. 3 shows read-in (or write) and read-out connections from cell 10, assuming it to be a data cell of access position X. In the embodiment of FIG. 2, data is written in or read out only from the X position data cells and only while they are in the static or hold state. Since in the static state the S-1 and S-4 switches are pulsed in alternation and since a write may not coincide with pulsing of S-4, the phase 4 pulse is applied to data cells 10 through an AND gate 30, the other terminal of which is conditioned via a line labeled WRITE CONTROL, through an inverter 32. Thus, AND gate 30 is conditioned except when a WRITE CONTROL signal inverted is applied thereto. Simultaneously with the WRITE CONTROL signal, data is read into input line 14 by the write circuitry shown. This circuitry assumes a write input from flip flop type devices which produce an output on one of two lines depending on whether the value is 1 or 0. An IN-1 output on a line so marked conditions a transistor switch 34 (like switches S-1 to S-4) to transmit a positive voltage +V on line 35 to line 36 and line 14. An IN-0 output on a line so marked conditions transistor switch 37 to connect conductor 14 to ground potential via lines 38 and 39.

Data read-out from each cell 10 is from a connection to line 22 through an inverter 40 to a line marked TO READ GATES. The inverter is necessary since line 22 is at an inverted potential to that on line 14 which it is desired to read, and it may be a complementary field effect transistor like T-1 and T-2. No inhibit circuitry is needed since read-out may take place while the S-1 or S-4 switches are pulsed and these are the only switches pulsed in the static state. Line 22, being the output line, also goes to the S-3 switch of position 1, as indicated on the drawing.

The read-out connections for the address cells of position X to the comparison circuitry may be the same although they operate first while the cell is in the static state and thereafter, if X does not contain the desired word, as each new word and its address is shifted into position X. During each left shift of a search in which switches S-3 and S-4 are alternately pulsed, the new shifted address value inverted replaces the previous value on line 22 and the read-out circuitry again inverts to the shifted value. It should be noted that read-out of data and addresses could be from line 26 without inversion but this would require an additional readout line to line 22 which would, undesirably, either make cell 10 of different construction than the others or require the additional and unused read out line in all the other cells.

Although the above description of the storage cells shown in FIG. 3 referred to left and right shifts without mentioning up and down shifts, those skilled in the art will recognize that, in terms of implementation, there is no significant different between shifting in a vertical direction and shifting in a horizontal direction.

Those skilled in the art will also recognize that the selection, in this description, of the lower left cell of the matrix as the access cell was completely arbitrary and needed not be adhered to. In actuality, any cell in the matrix (even one in the center, although this might present some problems in implementation) could be selected as the access cell. Also, it will be understood that references herein to "columns" and "rows" could be interchanged (e.g., a "page" or "sector" could be any column of the matrix) and would still be within the spirit of this invention.

Shift Control Unit

Figure 4:
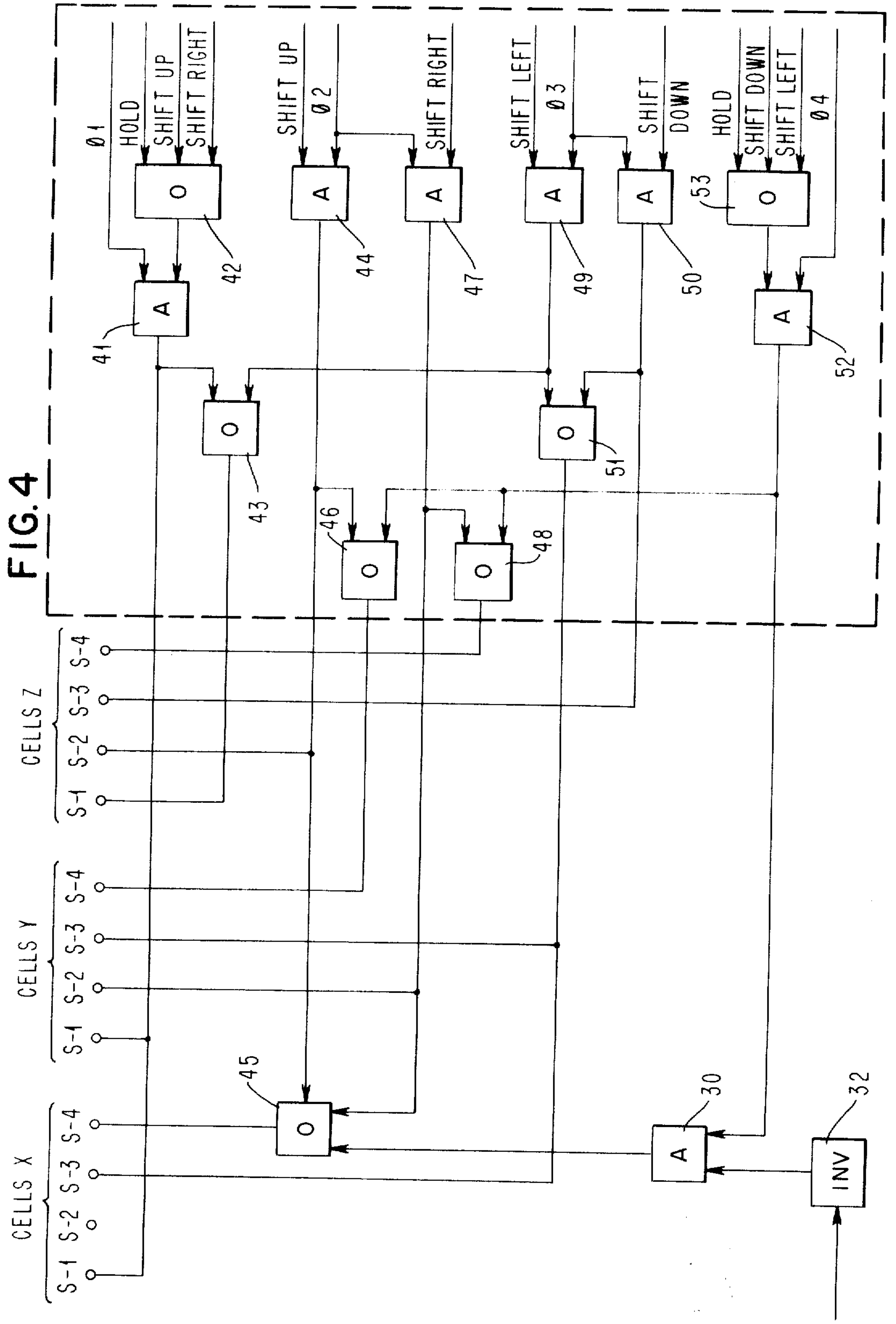
FIG. 4 illustrates shift phase connections to various positions of the storage matrix.

FIG. 4 diagrams suitable shift phase pulse connections to the switches S-1 to S-4 of cell X (cell 10, FIG. 3) and cells Y and Z (cell 12, FIG. 3) of FIG. 2. The phase 1 pulse is applied to the S-1 switch of all cells through an AND gate 41 the other terminal of which is conditioned by either a HOLD or a SHIFT UP or a SHIFT RIGHT signal through OR gate 42. The output of AND 41 goes directly to the S-1 switch of cells X and Y and, through OR gate 43 to the S-1 switch of cells Z. When a SHIFT UP SIGNAL is present, the phase 2 pulse is applied, via AND gate 44 to the S-2 switch of cells Z and to the S-4 switch of cell X through OR gate 45. The reason for this is that switch S-2 is operated only on an UP shift involving cells Z or on a RIGHT shift involving cells Y, and the X cell does not participate in RIGHT or UP shifts. While the right shift or an up shift is in progress in other cells of the matrix, the X cell is in the hold, static state which calls for pulsing of its switches S-1 and S-4 in alteration. Its switch S-1 is pulsed on a RIGHT or UP shift from the phase 1 line and its S-4 switch is pulsed from the phase 2 line via the OR gate 45. Likewise, during an UP shift, cells Y may be maintained in the hold state by transmitting the phase 2 pulse via OR gate 46 to switch S-4 of cells Y. When the SHIFT RIGHT signal is present, the phase 2 pulse will be transmitted to the S-2 switch of cells Y via AND gate 47 and to the S-4 switch of cell X and cells Z via OR gates 45 and 48, respectively. The phase 3 pulse is handled in a manner similar to phase 2. When a SHIFT LEFT signal is present, the phase 3 pulse is transmitted via AND 49 and OR 43 to the S-1 switch of cells Z, which do not participate in a left shift, to keep them in their hold condition. When a SHIFT DOWN signal is present, the phase 3 pulse will be transmitted via AND 50 to switch S-3 of cells Z. The phase 3 pulse will always be transmitted, via AND 49 in the presence of a SHIFT LEFT signal or AND 50 in the presence of a SHIFT DOWN signal, through OR 51 to the S-3 switch of cells X and Y. The phase 4 pulse is applied via AND 52 when its other input is conditioned through OR 53 by a HOLD, SHIFT DOWN, or SHIFT LEFT signal to the S-4 input of cells Y through OR 46, to the S-4 input of cells Z through OR 48 and to the S-4 switch of cell X via AND gate 30 (see FIG. 3) and OR gate 45.

Figure 5:
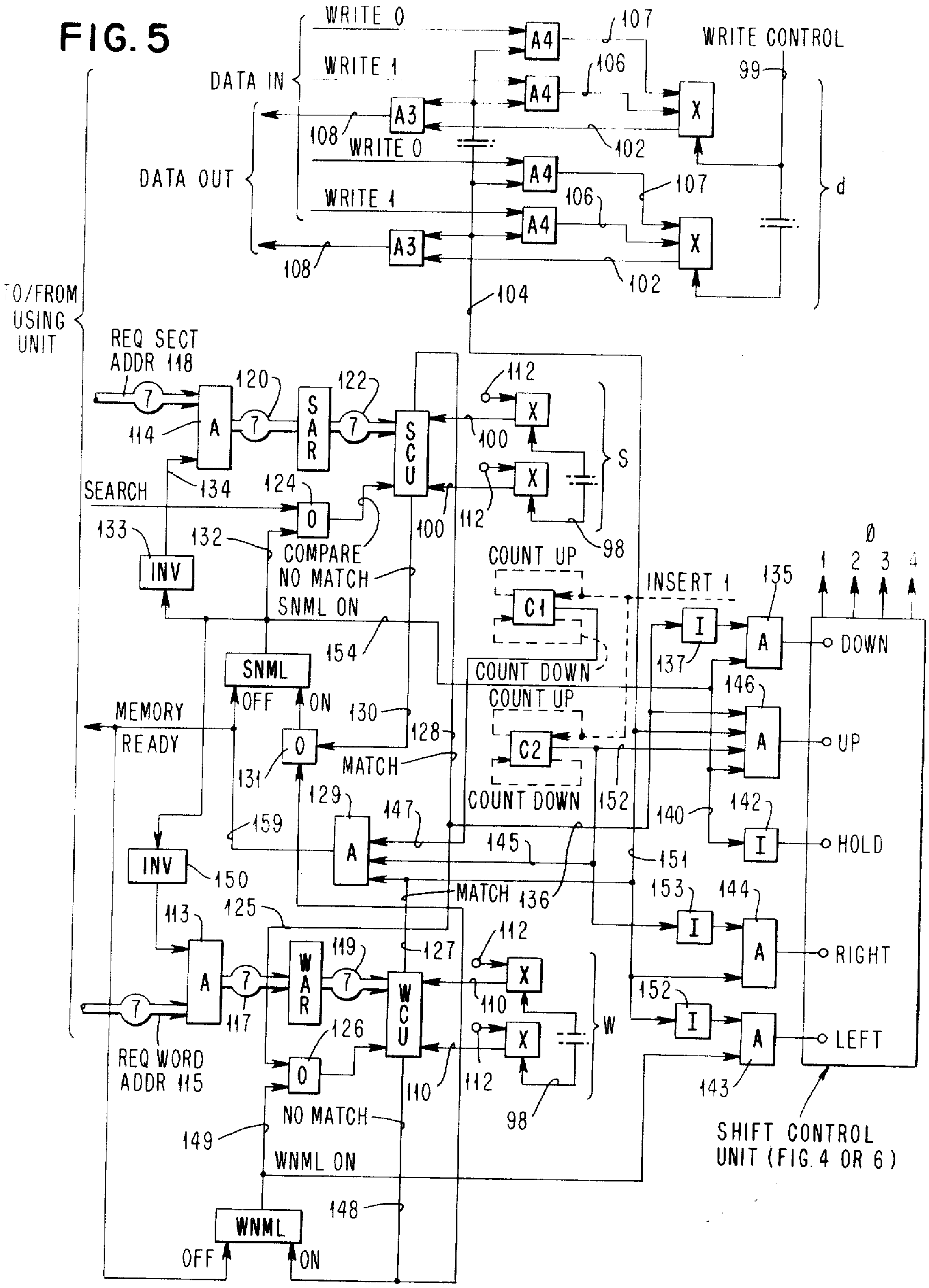
FIG. 5 shows, in block diagram, controls for operating the matrices and for reordering pages and words according to the invention.

The control circuitry just described, which is enclosed in the dashed line rectangle in FIG. 4 may be utilized as the SHIFT CONTROL UNIT of FIG. 5. This control circuitry may also be utilized to enable ANDs A1 (FIG. 2) when shifting downward in loop L1, or to enable ANDs A2 (FIG. 2) when shifting left in loop L3.

Control Circuitry

FIG. 5 shows control circuitry for the matrices in accordance with the embodiment diagrammatically illustrated in FIGS. 1 and 2, utilizing memory cells and connections according to FIGS. 3 and 4. There are *d* data matrices (first and last only shown), *s* sector address matrices (first and last only shown), *w* word address matrices (first and last only shown) and two shift register counters C1 and C2. For each of the matrices, only the access cell X is shown, it being understood that shifting of data into and out of the access cell X will be in the manner that has been described above.

For addressing the memory, the *a* address bits are divided into two logical groupings comprising *s* sector address bits and *w* word address bits. The memory is preferably constructed with such dimensions that each sector contains a number of words that is equal to a power of 2. In the preferred embodiment, each sector contains 128 words ($128 = 2^7$) and there are 128 sectors, resulting in a total memory size of 16,384 words. If, when the memory is initially loaded, word addresses are assigned sequentially (starting with address 00 . . . 00) to all of the words in one sector, then to all of the words in another sector, and so on until all of the words in all of the sectors have been assigned addresses, then the addresses of all words in any given sector will contain the identical high-order address bits. Thus, in the preferred embodiment which utilizes a memory having 128 sectors each of which contains 128 words, the first sector that is loaded through the memory would contain words whose addresses are 0 through 127 (expressed in decimal form); the second sector loaded would contain addresses 128 through 255; the third sector loaded would contain addresses 256 through 383; the fourth sector loaded would contain addresses 384 through 511; . . . ; and the last sector loaded would contain addresses 16,257 through 16,384. In order to express 16,384 different addresses in binary form, 14 address bits are required. If addresses are assigned in the manner just described, then the seven high-order bits of the address of each word in the first, second, third, fourth and last sectors loaded will be 0000000, 0000001, 0000010, 0000011, 0000100 and 1111111, respectively. These seven high-order bits comprise a unique sector address for each sector in the memory module.

The sector address bits from the X cell of the *s* sector address matrices are applied over lines 100 to corresponding terminals of a Sector Comparison Unit SCU. The word address bits (the low-order bits of the address, which identify a word within a sector) from the X position of the *w* word address matrices are applied over lines 110 to corresponding terminals of a Word Comparison Unit WCU. Each X position bit of the *d* data matrices has an output line 102 from its output circuitry (FIG. 3) to AND gate A3, the other terminal of which is conditioned from a line 104; and two input lines 106, 107 from two AND gates A4 which are connected respectively to the line IN-1 and IN-0 of each bit (see FIG. 3). The A3 AND gates have DATA OUT line 108 for transmitting the data from the corresponding X positions of the data matrices to the using unit of the system. The A4 AND gates have input lines WRITE 1 and WRITE 0 respectively from the data source of the system which condition one terminal of these respective AND gates, the other terminal thereof being conditioned from line 104. (The input lines (not shown) to input terminals 112 and the WRITE CONTROL lines 98 of the X positions of the address matrices would be utilized only when initially loading all matrices of the memory module. The lines to terminals 112 may, for example, come from a counter.)

A using unit requesting access to a word sends the sector address bits thereof over lines 118 to AND gates 114 which are conditioned as hereinafter explained and from which the bits are passed by lines 120 to corresponding bit positions of a Sector Address Register SAR. The bits from the SAR are in turn applied to corresponding terminals of the Sector Comparison Unit SCU by lines 122. (The lines 118, 120, 122 which provide the connections described above are each represented in the drawing as a bus with the numeral "7" to show the number of lines contained in the bus.)

The using unit requesting access also sends, in parallel with the above, the word address bits of the requested word over lines 115 to AND gates 113 which are conditioned as hereinafter explained and from which the bits are passed by lines 117 to corresponding bit positions of a Word Address Register WAR. The bits from the WAR are in turn applied to corresponding terminals of the Word Comparison Unit WCU by lines 119.

The SCU and the WCU may utilize conventional comparison circuitry which produces an output on a line labeled NO MATCH when any of the compared bits are not the same and which produces an output on a line labeled MATCH when all compared bits are the same. Circuitry which may be utilized for the SCU and the WCU is shown, for example, in FIG. 5A of previously referenced co-pending application Ser. No. 103,201 filed Dec. 30, 1970. Said application is to be regarded as being incorporated herein. The SAR and the WAR are conventional storage registers which apply their 1 or 0 bit values to lines 122 and 119, respectively.

Simultaneously with loading the SAR and the WAR, the using unit sends a signal on a SEARCH line which, through OR gate 124 activates the comparison circuitry of the SCU. If the requested address is for a word which is contained in the most recently addressed sector, that sector will already be in the lower row of the matrix and the SCU will provide an output to the line 128 labeled MATCH which signals that the desired sector is in access position.

The MATCH output from the SCU is also transmitted, via line 125 through OR 126 to activate the comparison circuitry of the WCU. If the requested word was the most recently accessed word, it will already be in the X position of the matrix and the WCU will proide an output on MATCH line 127. MATCH line 127 provides a signal on line 104 to condition the AND gates A4 to apply the data signals, if any, provided by the using unit on the WRITE 1 or WRITE 0 lines to the input circuitry of the X position data cells, the using unit also providing a signal on the WRITE CONTROL line 99 to inhibit switching S-4 (FIG. 3). The signal on line 104 also conditions AND gates A3 for read-out so that the using unit can read or write at its election. The MATCH signal on line 127 also conditions one terminal of AND 129, the other two terminals of which are conditioned by read-out of counters C1 and C2 (as will be further described below) to provide a signal to the using unit on a line labeled MEMORY READY, signifying that the using unit may start another search as soon as it has completed its read or write operation. Read/write gates A4 and A3 will remain conditioned as long as the using unit conditions the SEARCH line.

If the requested word is not within a sector that is already in the lowermost row of the matrix (i.e., the word is not within the most recently accessed sector), the resultant SCU output on the NO MATCH line 130, through OR gate 131, turns on a Sector No Match Latch SNML. The output from the latch SNML to a line labeled SNML "ON" goes via line 132 to OR gate 124 to lock the SCU in search-compare condition. Also the requested address put gates 113 and 114, previously conditioned from the SNML "ON" line through inverters 150 and 133 by the SNML latch being off, are now deconditioned by the output on SNML "ON." The output on line SNML "ON" also conditions one terminal of AND gate 135, the other terminal of which is conditioned by the absence of a MATCH output on line 128 by line 136 and inverter 137. The output of gate 135 is applied to the shift down lines of the shift control circuitry of FIG. 4 as indicated in FIG. 5 by the block labeled SHIFT CONTROL UNIT and its terminal labeled DOWN to which AND 135 is connected. The HOLD control lines of the shift control circuitry, previously activated by absence of output on the SNML "ON" line via line 140 and inverter 142 to the HOLD input of the SHIFT CONTROL UNIT, are now inactivated by the inverted output from line SNML "ON."

In order to proceed further with this description of system operation, it is first necessary to describe the operation of counters C1 and C2. Counter C1 may be any suitable counter capable of counting in one direction as "up" the number of down shifts in loop L1 of the shift circuitry on a search until the desired sector is found, and then counting in the reverse direction or "down" until the count returns to zero which is signaled by an output. Similarly, C2 counts "up" the number of left shifts in loop L3 on a search until the desired word is found, and then counts "down" until the count returns to zero. Since it fits so well with the control circuitry of FIG. 4, each of counters C1 and C2 is assumed to be a two-way static shift register similar to a column in the address and data matrices and connected in the same manner to the shift controls of FIG. 4. When the matrices are initially loaded, a positive or "1" charge is inserted in the 1 position cell at the right hand end of the counter, as indicated by the dotted line labeled INSERT 1 in FIG. 5, and is permanently stored in the counter, all other cells being at zero.

When the data and address matrices are shifted down (loop L1, FIG. 2) in FIG. 5 by the conditioning of AND gate 135 and the down shift control circuitry of FIG. 4, count C1 is shifted left in unison therewith by the same control circuitry, thus transferring the 1 from position 1 successively to the cells to the left at each shift, thus counting the number of down shifts or counting "up," as indicated by the shift left loop in FIG. 5 labeled COUNT UP.

Then, after the desired sector has been shifted to the lowest row of the matrix and the row is shifted left (loop L3, FIG. 2) in FIG. 5 (by the conditioning of AND gate 143 and the left shift control circuitry of FIG. 4) counter C2 is shifted left in unison therewith by the same control circuitry, thus transferring the 1 from position 1 successively to the cells to the left at each shift, thus counting the number of left shifts of counting "up," as indicated by the shift left loop in FIG. 5 labeled COUNT UP.

When the desired word is located and the lowest row of the data and address matrices are then shifted right (loop L4, FIG. 2) by conditioning of AND gate 144 and the right shift circuitry of FIG. 4, counter C2 is shifted to the right in unison with the matrices, as indicated in FIG. 5 by the shift right loop labeled COUNT DOWN. When the count "down" in C2 equals the count "up" the word in the X position at the start of the search will be in the next Y position and the 1 value in C2 will have returned to counter position 1 where it is read out on line 145 to gate 129.

For reordering the sectors, when the data and address matrices are shifted up (loop L2, FIG. 2) by conditioning of AND gate 146 and the up shift circuitry of FIG. 4, counter C1 is shifted to the right in unison with the matrices, as indicated in FIG. 5 by the shift right loop labeled COUNT DOWN. When the count "down" equals the count "up" the sector in the lowest row at the start of the search will be in the next row up (the lowest "Z" row) and the 1 value will have returned to counter position 1 where it is read out on line 147 to gate 129, conditioning the last input thereof to produce the MEMORY READY signal, turn off the SNML (and the WNML described below), thereby, via line 140 and inverter 142 restoring all memory cells, including those in counters C1 and C2, to the HOLD condition.

Although, in this preferred embodiment C1 and C2 are implemented as shift registers, it will be recognized that each of them may be any suitable device for counting "up" and counting "down" as the matrices are shifted and for presenting an output signal when the count "down" equals the count "up."

As long as the Sector No Match Latch SNML is on, the Sector Compare Unit SCU is locked in search-compare condition and, so long as ther is no signal on the MATCH line 128 from the SCU, AND 135 will be presenting a signal to the DOWN line of the SHIFT CONTROL UNIT to cause the matrix sectors to be shifted downward. With each downward shift, counter C1 will be incremented. The downward shifting and counter incrementation will continue until the desired sector has been shifted to the bottom rows of the matrices. When this occurs, the *s* sector address bits transmitted to the SCU via lines 100 will be identical to the sector address bits (the high order bits of the address of the desired word) received from the using unit via lines 118. The SCU will then produce an output on MATCH line 128 which, via line 136 and inverter 137 will disable AND 135 to terminate downward shifting.

The MATCH SIGNAL on line 128 is also carried, via line 125 and OR gate 126 to activate the comparison circuitry of Word Comparison Unit WCU to compare *w* word address bits received via lines 110 from the word address matrices with the word address bits that are received via lines 115 from the using unit and stored in the Word Address Register WAR. If the requested word is the word within its sector that was most recently accessed, that word will already be in the access cell X and the WCU will provide an output to the MATCH line 127 which will produce a signal on line 104 which then enables AND gate A3 and A4 to signal the using unit that the desired word is in access position and to enable the using unit to write into or read from the memory. If the requested word is not already in the X cell, the resultant WCU output on the NO MATCH line 148 turns on a Word No Match Latch WNML. The signal on line 48 is also used, through OR 131 to turn on the Sector No Match Latch SNML, in case it had not previously been turned on by a signal on line 130. Turning on SNML will, via line 140 and inverter 142, remove the HOLD signal from the SHIFT CONTROL UNIT. The output from the latch WNML to a line labeled WNML "ON" goes via line 149 to OR gate 126 to lock the WCU in search-comare condition. (Also, the requested word address input gates 113, previously conditioned from the SNML "ON" line through inverter 150 since the SNML latch was off, are now deconditioned by the output on SNML "ON.") The output on line WNML "ON" also conditions one terminal of AND gate 143, the other terminal of which is conditioned by the absence of a MATCH output on line 127 by line 151 and inverter 152. The output of gate 143 is applied to the shift left lines of the shift control circuitry of FIG. 4 as indicated in FIG. 5 by the block labeled SHIFT CONTROL UNIT and its terminal labeled "LEFT" to which AND 143 is connected. The HOLD control lines of the shift control circuitry, previously activated by absence of output on the SNML "ON" line via line 140 and inverter 142 to the HOLD input of the SHIFT CONTROL UNIT, are now inactivated by the inverted output from line SNML "ON."

So long as WNML is one and there is no signal on MATCH line 127, AND 143 will be enabled and will cause the bottom row of the matrix to be shifted left in loop L3 (FIG. 2). Left shifting will continue, along with incrementation of counter C2, until the requested word is shifted into the access cells X of the matrices. This will result in the WCU producing a MATCH signal on line 127 which, via line 151 and inverter 152 will disenable AND 143, thereby terminating the left shifts. The signal on line 127 will also result in producing a signal on line 104 to enable AND's A3 and A4 to permit the using unit to access the desired word.

Now that the desired word has been shifted into the access cells of the matrices, matrix reordering will commence. The MATCH signal from the SCU is fed, via line 151, to one input of AND 144 the other input of which is conditioned by the presence of a non-zero count in counter C2 via line 152 and inverter 153. (Note that a "zero" count in C2, as described above, is signaled by the presence of a bit in the leftmost position of register C2.) As long as C2 contains a non-zero count, right shifts (loop L4, FIG. 2) will continue with C2 being decremented in unison therewith. When C2 has counted down to 0, AND 144 will be disabled via line 152 and inverter 153 to terminate right shifting. At this time the bottom rows of the matrices will have gone through a number of right shifts that is identical to the number of left shifts that were required in order to bring the desired word into the access cells X.

A zero count in C2 will provide, via line 152, one input to four-input AND 146. The remaining inputs to AND 146 are provided by: a MATCH signal from the SCU via lines 128 and 136; a MATCH signal from the WCU via line 127; and the SNML ON signal via line 154. Thus, after the right shifts in the bottom row of the matrix have been completed, all rows in the matrix, except the bottom row which contains the sector containing the most recently accessed word, will be shifted upward in loops L2 (see FIG. 2) with C1 being decremented in unison therewith. The upward shifts will continue until counter C1 counts down to zero thereby providing an input to AND 129 via line 147. Since the other two inputs to AND 129 (WCU MATCH on line 127 and C2 count = zero on line 145) will already be present, the signal on line 147 will enable AND 129 to produce a signal on line 159 which signals MEMORY READY and which turns off SNML and WNML. Turning off SNML will, via line 154, disable AND 146 thereby terminating the upward shifts. At this time, each row except the bottom row of the matrix (that is, all of the rows which are made up of "Z" cells) will have been shifted upwards a number of shifts that is exactly equal to the number of downward shifts that were originally required in order to get the desired sector into the bottom row of the matrix.

After all of the shifting has been concluded, the sector which contains the most recently accessed word will be in the bottom row of the matrix, and all sectors that had previously been closer to the bottom row than this sector will each have been moved up one. Also, within the paticular sector, the accessed word will now occupy the access cells X, and all words that had previously been nearer to the leftmost end of the sector will each have been moved to the right by one position. Thus it may be seen that all sectors from which a word has been accessed will be ordered in a sequence such that the sectors from which words have most recently been accessed will be nearer to the bottom than any sector which was the subject of a less recent access. Also, within each sector, all words that have been accessed will be arranged in such a manner that the more recently accessed words will be nearer to the side of the sector from which access is achieved (in the embodiment described herein, the leftmost side) than will the less recently accessed words.

Each time that an access request is made by the using unit, the control system shown in FIG. 5 will handle one of four basic situations:

1. Neither the first sector address comparison nor the first word address comparison results in a match;
2. The first sector address comparison results in a match but the first word address comparison does not;
3. There is no match on the first sector address comparison but, after downward shifting, there is a match on the first word address comparison; or
4. A match is achieved on both the first sector address comparison and the first word address comparison.

The first case has been described in detail above. It will result in a sequence of down shifts in loop L1 with incrementation of C1, followed by a sequence of left shifts in loop L3 with incrementation of C2, followed by a sequence of right shifts in loop L4 with decrementation of C2, followed finally by a sequence of up shifts in loop L2 with decrementation of C1.

For case number 2, operation is as follows. When the sector which contains the requested word is already in the lowest row of the matrices, the first comparison initiated by the SEARCH line through OR 124 will cause the SCU to produce a signal on its MATCH line 128 without turning on SNML. The signal on line 128 will, via line 125 and OR 126 cause WCU to perform a comparison. For this case, the comparison will result in a NO MATCH signal on line 148 which will turn on WNML and will also turn on, via OR 131, SNML. As a result of this, AND 143 will become enabled and will cause the bottom row of the matrices to be shifted left in loop L3 until the requested word is shifted into the access cells X. In unison with the left shifts, counter C2 will be incremented. After the requested word becomes accessible, AND 143 will be disabled to terminate the left shifting, the MATCH signal on line 127 will make the requested word accessible to the using unit and AND 144 will become enabled thereby commencing right shifting in loop L4. Counter C2 will be decremented in unison with the right shifts of the bottom row of the matrix. When C2 has been decremented to zero, AND 129 will be enabled (note that C1 already contains a zero count) to produce, via line 159, the MEMORY READY signal and to turn off SNML and WNML. Turning off SNML will, via line 140 and inverter 142 cause all of the memory cells to be put into their HOLD condition.

For case number 3 mentioned above, the initial comparison in SCU will result in a NO MATCH signal on line 130 being transferred through OR 131 to turn on SNML. This will energize AND 135 to cause downward shifting in loop L1 of the rows in the matrices (with simultaneous incrementation of C1) until the desired sector is in the bottom rows of the matrices. When the SCU detects a sector address match, the MATCH signal on line 128 will disable AND 135 to terminate downward shifting and will also, via line 125 and OR 126 cause WCU to perform a word address comparison. In this case, the word address comparison results in a MATCH signal on line 127. This MATCH signal on line 127 will make the requested word available to the using unit and will also result in energizing AND 146 to commence upward shifting in loop L2 with simultaneous decrementation of C1. When C1 has been decremented to zero, AND 129 will be energized (MATCH line 127 is up and C2 still contains a zero count) to produce a signal on line 159 to raise MEMORY READY and to turn off SNML thereby restoring, via line 140 and inverter 142, all of the cells in the matrices to their HOLD condition.

The fourth case mentioned above will occur when the requested word is already located in the access cells X (that is, when there are two sequential requests for the same word). In this case, the initial comparison in SCU will result in a MATCH signal on line 128. This signal, via line 125 and OR 126 will initiate a comparison in WCU which comparison will also result in a MATCH signal on line 127. MATCH signal 127 will, through line 104, make the requested word available to the using unit and will also energize AND 129 (both C1 and C2 contain zero counts) to raise the MEMORY READY line. Both latches SNML and WNML will remain in their off condition.

Alternative Shift Control Unit

Figure 6:
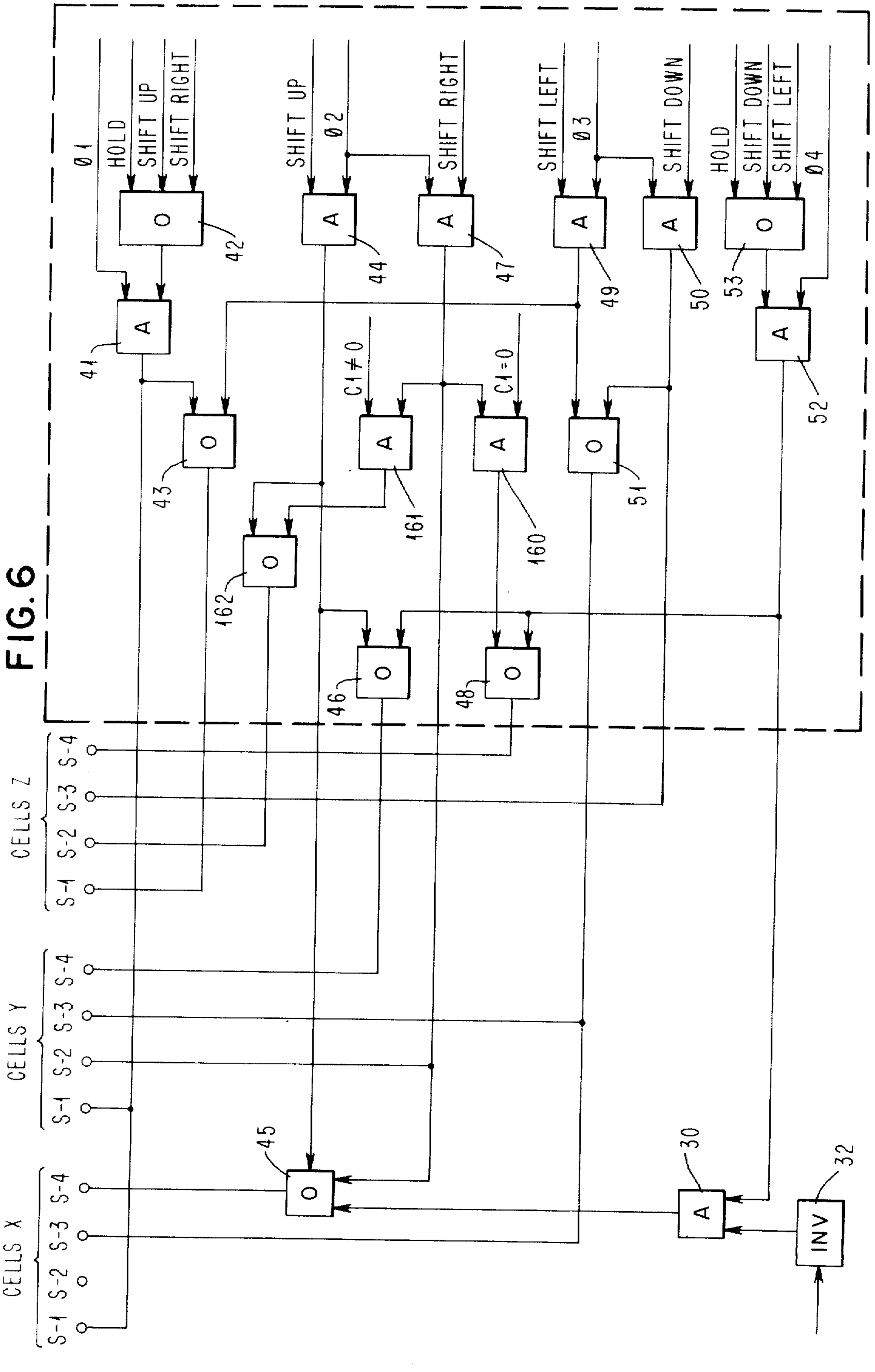
FIG. 6 illustrates a modification of the shift phase connections shown in FIG. 4.

In computing total access time for the system described above, there are two factors to take into consideration. First, there is the time consumed by down shifts and by left shifts in order to make a word available to the using unit. A second factor which contributes a total access time for the system is the time consumed by subsequent right shifts and up shifts when the matrices are recorded. This factor must be considered because, until reordering has been completed, no new memory requests are accepted. In order to reduce the total time consumed by the reordering process, it is desirable to provide means for simultaneously performing shifts in more than one loop. FIG. 6 shows a preferred embodiment of the SHIFT CONTROL UNIT of FIG. 5 which will enable up shifts and right shifts to be performed at the same time. The only circuitry shown in FIG. 6 which is not also present in the embodiment shown in FIG. 4 are two AND gates 160 and 161 and an OR gate 162. All of the remaining circuitry shown in FIG. 6 is also present in FIG. 4 and has been given reference numerals which correspond to those used in FIG. 4. In addition to the three gates 160, 161, 162, the SHIFT CONTROL UNIT shown within the dashed rectangle of FIG. 6 also requires inputs from counter C1. The changes introduced in FIG. 6 will only affect the SHIFT CONTROL UNIT when a phase 2 pulse is present. At all other times, operation will be exactly identical to that described with respect to FIG. 4. Referring to FIG. 4, it will be seen that the concurrence of a phase 2 pulse and a SHIFT UP signal (produced by AND 146 of FIG. 5) enabled AND 44, the output of which was directly connected to the S-2 switch of cells Z. Referring back to FIG. 6, it will be seen that the only difference in this situation is that the output of AND 44 is fed through OR 162 to the S-2 switch of cells Z. Referring back to FIG. 4, it will be seen that the concurrence of a phase 2 pulse and a SHIFT RIGHT signal (AND 144 of FIG. 5 is enabled) enabled AND 47, the output of which was always transmitted through OR 48 to the S-4 switch of cells Z to maintain all of the Z cells in their hold condition during a right shift. Referring again to FIG. 6, it will be seen that the output of AND 47 is not fed directly to OR 48 but, rather, to one input of each of AND gates 160 and 161. AND 160 receives its other input from counter C1 and is enabled when C1 contains a zero count. When AND 160 is enabled, it furnishes an output through OR 48 to switch S-4 of cells Z to maintain all of the Z cells in their hold condition in exactly the same manner as the circuitry in FIG. 4. However, when C1 contains a non-zero count, AND 161 will be enabled and will cause a shift pulse to pass through OR 162 to switch S-2 of cells Z thereby causing an upward shift in loop L2 (FIG. 2) at the same time that right shifts are being performed in loop L4 (FIG. 2). Of course, the phase 2 pulse which resulted in the upward shift will also be transmitted to C1 to decrement the count. Thus, whenever right shifts in the bottom row of the matrices are performed, up shifts, if required, will be simultaneously performed.

From the above description of FIG. 6, those skilled in the art will no doubt realize that, by the addition of some more circuitry to the SHIFT CONTROL UNIT, upward shifting in loop L2 (FIG. 2) could also be overlapped with left shifting in loop L3 (FIG. 2) of the bottom row of the matrix. However, this would require substantially more additional circuitry than has been described above and the small improvement in access time achieved thereby may not justify the expense.

Alternative Memory Matrix

Figure 7:
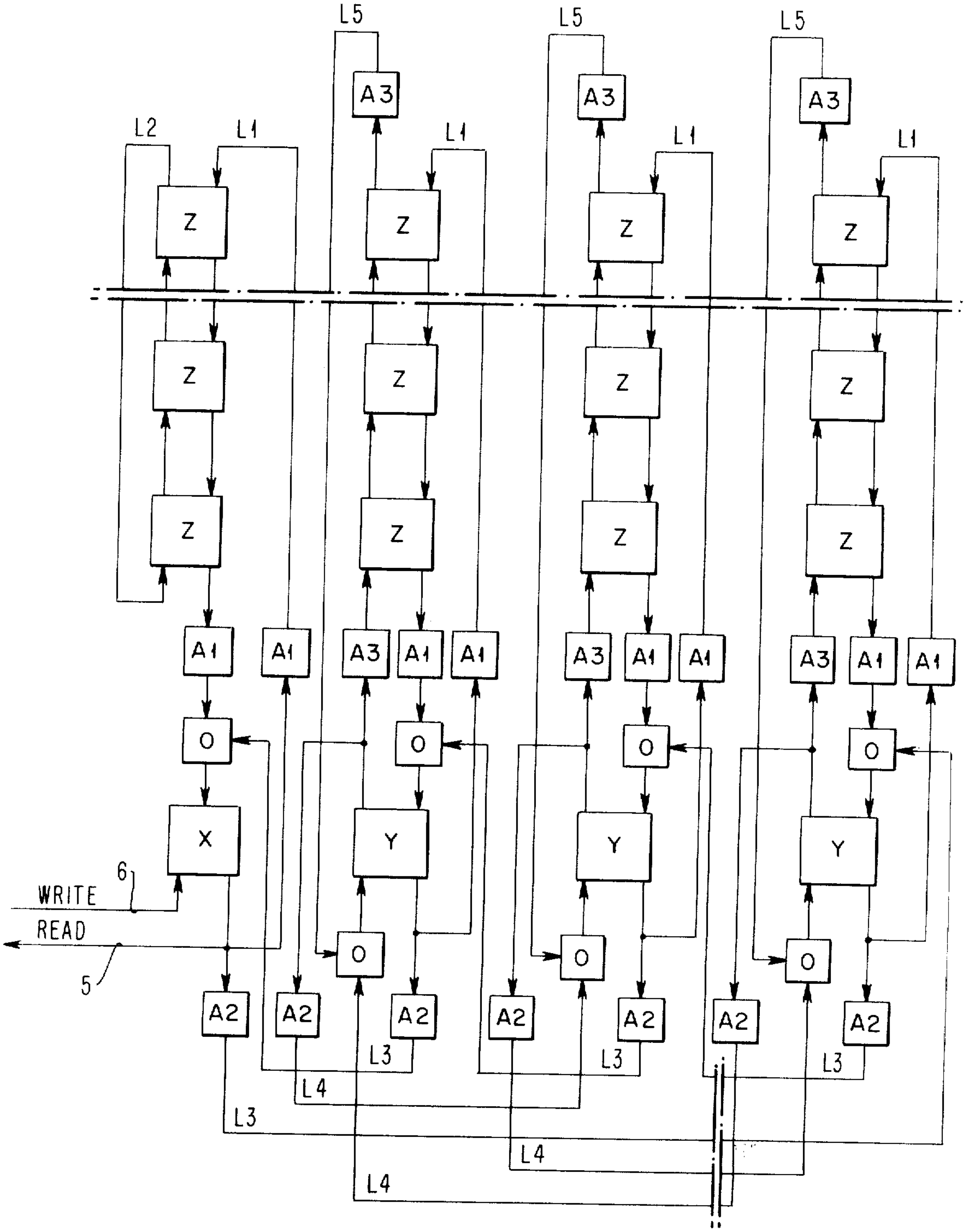
FIG. 7 is a diagrammatic layout of a second embodiment of a storage matrix.

FIG. 7 illustrates the manner in which words are accessed by shifting within the matrices in accordance with an alternative embodiment of the invention. In FIG. 7 (as in FIG. 2), the access (input/output) cell is designated X, the other cells on the bottom row of the matrix are designated Y, and all remaining cells are designated Z. As shown in FIG. 7, the matrix may shift data among the cells in five distinct shift loops: in each column, data may be shifted downward in loop L1, which includes all of the memory cells in the column, with data from the bottom cell wrapping up to the top cell; in the column which includes the access cell X (the leftmost column) data may be shifted upward in loop L2 which includes all cells in the column except the X cell, with data from the top cell wrapping around to the second cell from the bottom (the lowest Z cell); in the bottom row of the matrix, data may be shifted to the left through loop L3, which includes all of the cells (access cell X and cells Y) of the bottom row, with data from cell X wrapping around to the rightmost Y cell (in the drawing, loop L3 goes through the OR circuits 0 which at the upper right of each cell in the bottom row, through the cell and out the lower right portion through AND circuit A2, and to the next OR circuit); in the bottom row, data may be shifted to the right in loop L4, which includes the memory cells in the bottom row except the access cell X, with data from the rightmost cell wrapping around to the leftmost Y cell; and, in each column except the column which contains cell X (that is, each column which contains Z cells and a Y cell) data may be shifted upward in loop L5, which includes all of the cells in the column, with data from the top cell wrapping around to the bottom (Y) cell. In order to achieve memory accesses and to perform dynamic ordering, the matrix shown in FIG. 7 (and the other matrices which are operated in unison) operates as follows:

1. Upon receipt of a request for a memory access, AND gates A1 will be energized and each column of the matrix will shift downward in loop L1 until the requested word is in the bottom row of the matrix (in cell X or in one of the cells Y).
2. Then AND gates A2 will be enabled and the data will be shifted to the left in loop L3 until the desired data is in the access cell X. At this time, the data may be read from the memory on line 5 or new data may be written into the memory on line 6.
3. The data in the bottom row of the matrix will then be shifted to the right in loop L4 (comprising all of the bottom row except the access cell X). The number of right shifts in loop L4 will be exactly identical to the number of left shifts in loop L3 that were required to bring the desired data into the access cell.
4. Then AND gates A3 will be enabled and the data will be shifted upward in the matrix in loops L2 (for the column which contains the X cell) and L5 (for all other columns). The number of upward shifts in both loops L2 and L5 will be exactly identical to the number of downward shifts in loop L1 that were required to bring the desired data to the bottom row of the matrix.

Of the five shift loops shown in FIG. 7, loops L1, L2, L3 and L4 are identical to similarly labeled loops shown in FIG. 2. FIG. 7 differs from FIG. 2 in that loop L5 of FIG. 7 includes all of the memory cells in the matrix column whereas, in FIG. 2, none of the upward shift loops included the Y cell.

If, at the time of the memory access request, the desired data is already in cell X, none of the above steps will need to be executed; if, at the time of the memory request, the data is in one of the cells Y, then steps 1 and 4 would be eliminated; or if, after the execution of step 1, the desired data is found to be in cell X, then steps 2 and 3 would be eliminated.

Thus, each time that a word other than the leftmost word in a row is accessed, the words in that row will be reordered to the extent that the accessed word will become the leftmost word and all words that had been to the left of the access word will be moved to the right one position. Also, each time that a word is accessed from a row which was not the lowest row in the matrix at the time of the access request, after reordering the requested word will be in the bottom row and all of the other words in the row from which the requested word came will have returned to the row in the matrix from which they started at the time of the access request.

As will be explained below, implementation of a system using the matrix arrangement shown in FIG. 7 will generally be somewhat more complex than implementation of a system using the matrix arrangement of FIG. 2. However, the arrangement shown in FIG. 7 permits words to migrate from one "sector" to another in accordance with recency of usage and, in a system wherein there is no known logical relationship between various words of data that would make "paging" practical, the arrangement shown in FIG. 7 could result in improved average access times (because only one word in the bottom, most accessible, row is displaced rather than having the entire row displaced each time that the matrix is reordered) that might justify the increased complexity.

Shift Control Unit For Alternative Memory Matrix

Figure 8:
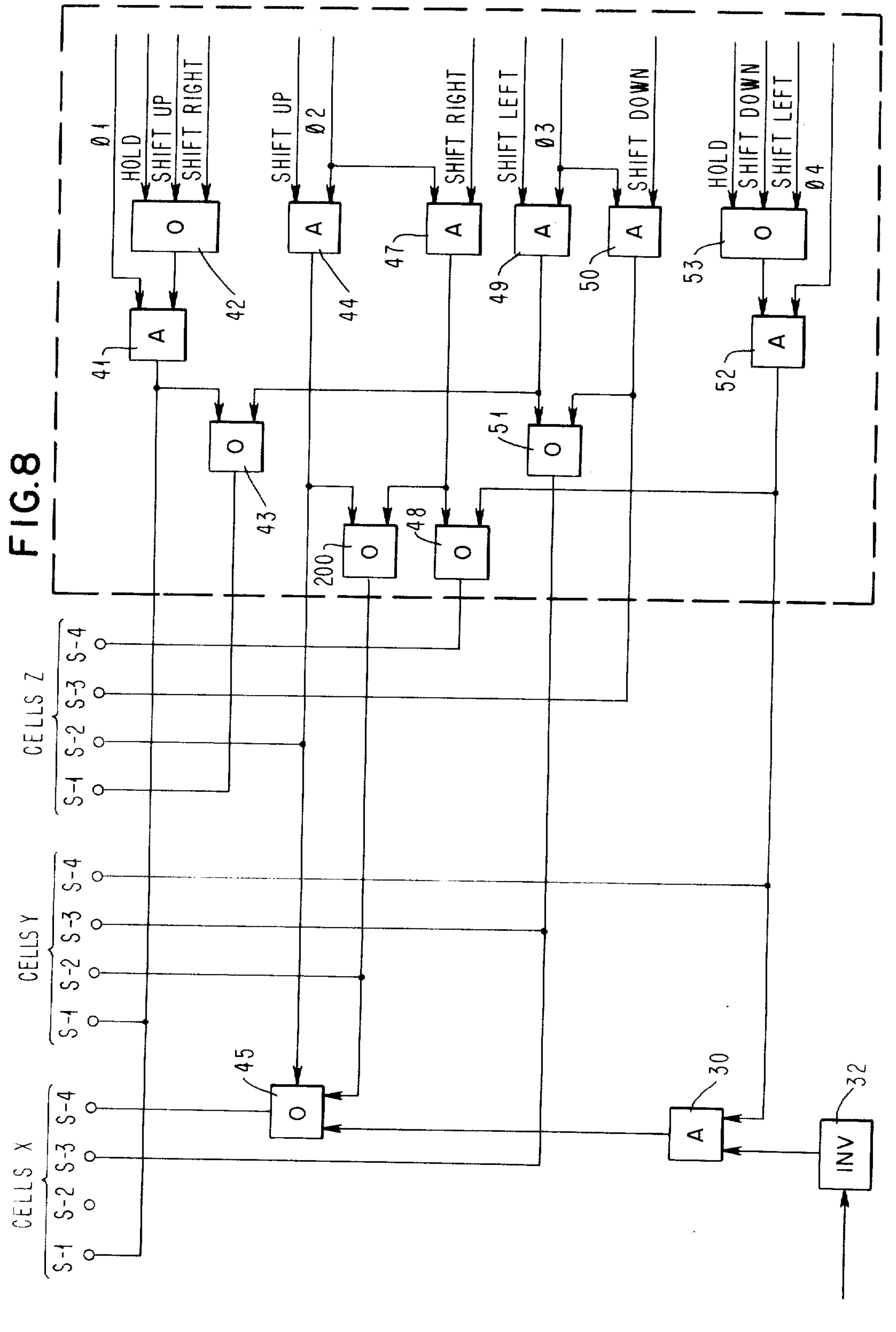
FIG. 8 illustrates shift phase connections that may be used to control the matrix illustrated in FIG. 7.

FIG. 8 diagrams suitable shift phase pulse connections to the switches S-1 to S-4 of cell X (cell 10, FIG. 3) and cells Y and Z (cell 12, FIG. 3) of FIG. 7. The only circuitry shown in FIG. 8 which is not also present in the embodiment shown in FIG. 4 is OR gate 200 which replaces OR gate 46 of FIG. 4. All of the remaining circuitry shown in FIG. 6 is also present in FIG. 4 and has been given reference numerals which correspond to those used in FIG. 4. The changes introduced in FIG. 6 will only affect the SHIFT CONTROL UNIT when a SHIFT UP signal is present. At all other times, operation will be exactly identical to that described with respect to FIG. 4. Referring to FIG. 4, it will be seen that the concurrence of a phase 2 pulse and a SHIFT UP signal (produced by AND 146 of FIG. 5) enabled AND 44, the output of which was connected to the S-2 switch of cells Z and, through OR 46, to the S-4 switch of cells Y. Referring back to FIG. 8, it will be seen that the difference in this situation is that the output of AND 44 (as well as the output of AND 47 when a SHIFT RIGHT signal is present) is fed through OR 200 to the S-2 switch of cells Y. This one change enables the Y cells to participate in upward shifts in loop L5 of FIG. 6.

Control Circuitry For Alternative Embodiment

Figure 9:
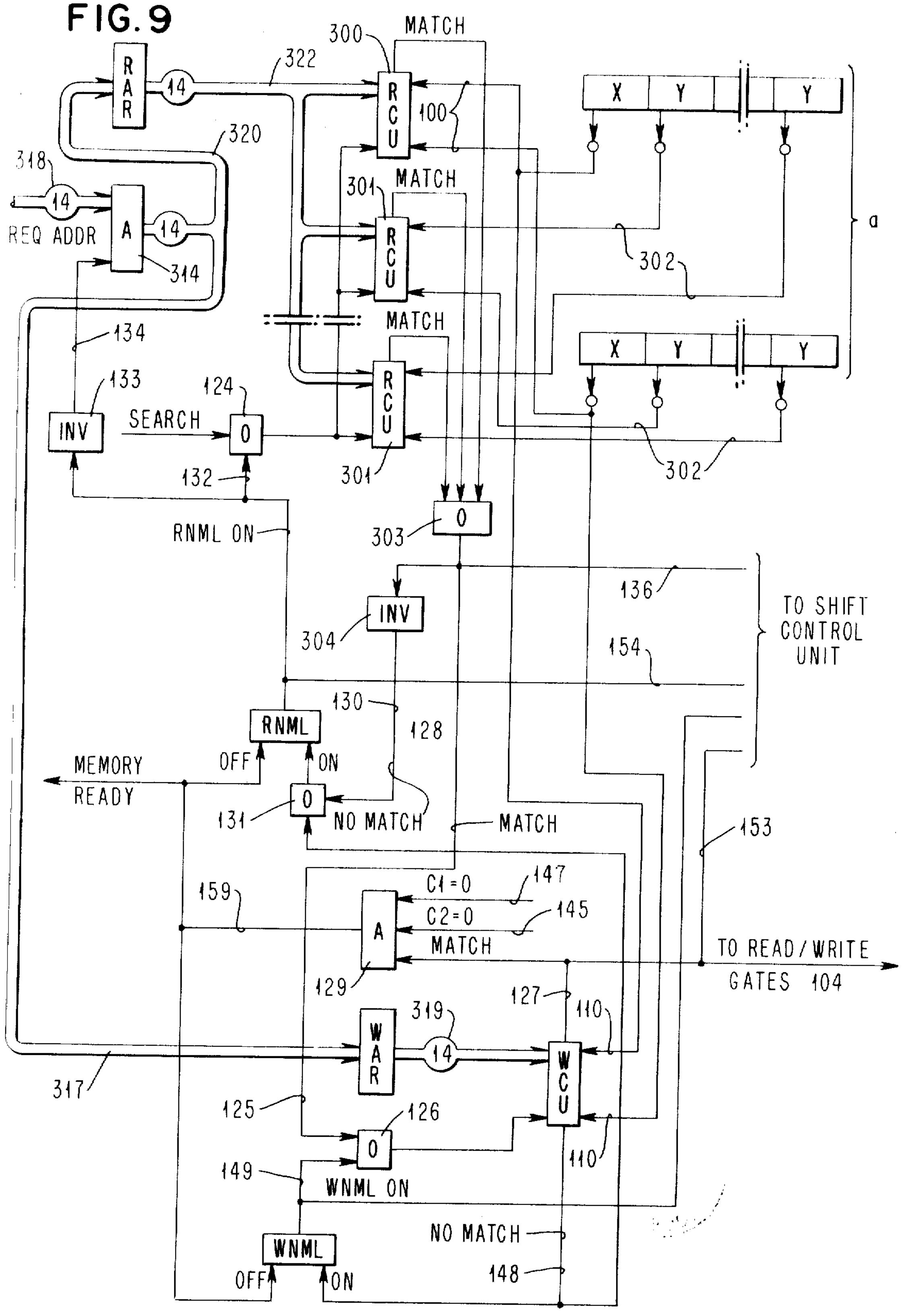
FIG. 9 shows, in block diagram, modifications to the controls of FIG. 5 for operating the matrices and reordering pages and words according to the second embodiment of the invention.

FIG. 9 shows control circuitry for the matrices in accordance with the embodiment diagrammatically illustrated in FIG. 7, utilizing memory cells and phase connections according to FIGS. 3 and 8, respectively. FIG. 9 is directed primarily to aspects of the control circuitry which are different from those shown in FIG. 5. Control elements which are the same as corresponding elements shown in FIG. 5 are labeled with the same reference numerals as were used in FIG. 5. Other elements of the control circuitry which, for the sake of increased clarity, have been omitted from FIG. 9 are identical to those shown in FIG. 5. (The one exception to this is the Shift Control Unit. The Shift Control Unit is connected to the control circuitry in exactly the same manner as was described above with respect to FIG. 5.) There are *d* data matrices (not shown), *a* address matrices (first and last only shown), and two shift register counters C1 and C2 (not shown). For each of the matrices, only the access cell X and the first and last cells Y of the bottom row are shown, it being understood that shifting of data into and out of the access cell X and cells Y will be in the manner that has been described above.

The primary difference introduced by this second embodiment of the invention concerns addressing of the memory. Because words are permitted to migrate between rows the addresses of the various words that are within a given row at any particular time will not necessarily exhibit any logical relationship to each other and, therefore, there will be no "sector address." Thus, when searching the matrix for a requested word, all of the *a* address bits (14 bits in the preferred embodiment) will need to be examined.

The address bits from the X cells of the *a* address matrices are applied over lines 100 to corresponding terminals of one Row Comparison Unit RCU 300 and over lines 110 to a Word Comparison Unit WCU. The address bits from the Y cells of (the bottom row of) the matrices are applied to respective Row Comparison Units RCU 301 over lines 302. In the preferred embodiment there are one hundred twenty-seven Y cells so there will be one hundred twenty-seven RCUs 301.

A using unit requesting access to a word sends the address bits thereof over lines 318 to AND gates 314 which are conditioned as hereinafter explained and from which the bits are passed by lines 320 to corresponding bit positions of a Row Address Register RAR. The bits from the RAR are in turn applied to corresponding terminals of the Row Comparison Units RCU 300 and 301 by lines 322. (The lines 318, 320, 322 which provide the connections described above are each represented in the drawing as a bus with the numeral "14" to show the number of lines contained in the bus.) The address bits are also transmitted through AND gates 314, via lines 317 to corresponding bit positions of a Word Address Register WAR. The bits from the WAR are in turn applied to corresponding terminals of the Word Comparison Unit WCU by lines 319.

Simultaneously with loading the RAR and WAR, the using unit sends a signal on a SEARCH line which, through OR gate 124 activates the comparison circuitry of the RCUs 300 and 301. If the requested address designates a word that is already in the lower row of the matrix, one of the RCUs will provide an output through OR 303 to the line 128 labeled MATCH which signals that the desired row is in access position.

The MATCH output from the RCU is also transmitted, via line 125 through OR 126 to activate the comparison circuitry of the WCU. If the requested word was the most recently accessed word, it will already be in the X position of the matrix and the WCU will provide an output on MATCH line 127. MATCH line 127 provides a signal on line 104 to condition the read/-write AND gates A3 and A4 (FIG. 5). The MATCH signal on line 127 also conditions one terminal of AND 129, the other two terminals of which are conditioned by read-out of counters C1 and C2 (FIG. 5) to provide a signal to the using unit on line labeled MEMORY READY, signifying that the using unit may start another search as soon as it has completed its read or write operation. Read/write gates A4 and A3 will remain conditioned as long as the using unit conditions the SEARCH line.

If the requested word is not already in the lowermost row of the matrix, the resultant SCU outputs will, after passing through OR 303 and inverter 304, produce a signal on the NO MATCH line 130 which, through OR gate 131, turns on the Row No Match Latch RNML. The output from the latch RNML to a line labeled RNML "ON" goes via line 132 to OR gate 124 to lock the RCUs in search-compare condition. Also the requested address input gates 314, previously conditioned from the RNML "ON" line through inverter 133 by the RNML latch being off, are now deconditioned by the output on RNML "ON." The output on line RNML "ON" also conditions one terminal of AND gate 135 (FIG. 5), the other terminal of which is conditioned by the absence of a MATCH output on line 128 by line 136 and inverter 137. THis will start downward shifting of the rows of the matrix in loops L1 (FIG. 7), along with incrementation of counter C1.

As long as the Row No Match Latch RNML is on, the Row Compare Units RCU are locked in search-compare condition and, so long as there is no signal on the MATCH line 128 from the RCUs, AND 135 will be presenting a signal to the DOWN line of the SHIFT CONTROL UNIT to cause the matrix rows to be shifted downward. With each downward shift, counter C1 will be incremented. The downward shifting and counter incrementation will continue until the desired row has been shifted to the bottom rows of the matrices. When this occurs, one of the RCUs will produce an output which will result in a signal on MATCH line 128 which will terminate downward shifting.

The MATCH SIGNAL on line 128 is also carried, via line 125 and OR gate 126 to activate the comparison circuitry of Word Comparison Unit WCU to compare *s* address bits received via lines 110 from the address matrices with the address bits that were received via lines 318 from the using unit and stored in the Word Address Register WAR. If the requested word is the word within its row that was most recently accessed, that word will already be in the access cell X and the WCU will provide an output of the MATCH line 127 which will produce a signal on line 104 enabling the read-write AND gates A3 and A4 to signal the using unit that the desired word is in access position and to enable the using unit to write into or read from the memory. If the requested word is not already in the X cell, the resultant WCU output on the NO MATCH line 148 turns on the Word No Match Latch WNML. The signal on line 148 is also used, through OR 131 to turn on the Row No Match Latch RNML, in case it has not previously been turned on by a signal on line 130. Turning on RNML will, via line 140 and inverter 142 (FIG. 5) remove the HOLD signal from the SHIFT CONTROL UNIT. The output from the latch WNML to a line labeled WNML "ON" goes via line 149 to OR gate 126 to lock the WCU in search-compare condition. The output on line WNML "ON" is also used, as shown in FIG. 5, to initiate leftward shifting of the bottom row of the matrix in shift loop L3 (see FIG. 7).

So long as WNML is on and there is no signal on MATCH line 127, AND 143 (FIG. 5) will be enabled and will cause the bottom row of the matrix to be shifted left in loop L3 (FIG. 7). Left shifting will continue, along with incrementation of counter C2, until the requested word is shifted into the access cells X of the matrices. This will result in the WCU producing a MATCH signal on line 127 which is used to terminate the left shifts. The signal on line 127 will also result in enabling the read/write AND's A3 and A4 (FIG. 5) to permit the using unit to access the desired word.

Now that the desired word has been shifted into the access cells of the matrices, matrix reordering will commence. The MATCH signal from the WCU along with a signal indicating a non-zero count in C2 are used as shown in FIG. 5 to cause the bottom row of the matrix to shift right in loop L4 (FIG. 7). As long as C2 contains a non-zero count, right shifts in loop L4 will continue with C2 being decremented in unison therewith. When C2 has counted down to 0, right shifting will be terminated. At this time, the bottom rows of the matrices will have gone through a number of right shifts that is identical to the number of left shifts that were required in order to bring the desired word into the access cells X.

A zero count in C2 will provide a signal which, along with other signals described above with respect to FIG. 5, will initiate upward shifting. As is shown in FIG. 7, the upward shifts are done in two separate loops: in the column which contains the access cell X (the leftmost column in FIG. 7) upward shifts take place in loop L2 which includes all of the cells in the column except cell X; in the other columns of the matrix, upward shifts take place in loops L5 each of which includes all of the cells in the column including the Y cell. Shifting in loops L2 and L5 is done simultaneously, with C1 being decremented in unison therewith. The upward shifts will continue until counter C1 counts down to zero thereby providing an input to AND 129 via line 147. Since the other two inputs to ANd 129 (WCU MATCH on line 127 and C2 count = zero on line 145) will already be present, the signal on line 147 will enable AND 129 to produce a signal on line 159 which signals MEMORY READY and which turns off RNML and WNML. Turning off RNML will terminate the upward shifts. At this time, there will have been a number of upward shifts in loops L2 and L5 that is exactly equal to the number of downward shifts that were originally required in order to get the desired word into the bottom row of the matrix.

After all of the shifting has been concluded: the most recently accessed word will be in the bottom rows of the matrices in the access cells X; the remaining words in the row from which the accessed word came will have returned to their original starting row in the matrix and, within that row, will have been reordered to the extent that each word that, at the time of the memory request, was located to the left of the requested word will have moved one position to the right; and, for each row that was originally lower in the matrix than the row which contained the requested word, the leftmost word in the row will have been shifted upon one position and all other words in the row will have returned to their original position. Thus it may be seen that, within each row all words that have been accessed will be ordered in such a manner that the more recently accessed words will be nearer to the end of the row from which access is achieved (in the embodiment described herein, the leftmost end) than will the less recently accessed words. Also, words that are accessed with high frequency will tend to migrate to rows that are relatively near to the bottom of the matrix.

Each time that an access request is made by the using unit, the control system shown in FIG. 9 will handle one of four basic situations:

1. Neither the first row address comparison nor the first word address comparison results in a match;
2. The first row address comparison results in a match but the first word address comparison does not;
3. There is no match on the first row address comparison but, after downward shifting, there is a match on the first word address comparison; or
4. A match is achieved on both the first row address comparison and the first word address comparison.

The first case has been described in detail above. It will result in a sequence of down shifts in loop L1 with incrementation of C1, followed by a sequence of left shifts in loop L3 with incrementation of C2, followed by a sequence of right shifts in loop L4 with decrementation of C2, followed finally by a sequence of up shifts in loops L2 and L5 with decrementation of C1.

For case number 2, operation is as follows. When the requested word is already in the lowest row of the matrices, the first comparison initiated by the SEARCH line through OR 124 will cause one of the RCUs to produce a signal on MATCH line 128 without turning on RNML. The signal on line 128 will, via line 125 and OR 126 cause the SCU to perform a comparison. For this case, the comparison will result in a NO MATCH signal on line 148 which will turn on WNML and will also turn on, via OR 131, RNML. As a result of this the bottom rows of the matrices will be shifted left in loop L3 until the requested word is shifted into the access cells X. In unison with the left shifts, counter C2 will be incremented. After the requested word becomes accessible, right shifting will commence in loop L4. Counter C2 will be decremented in unison with the right shifts of the bottom row of the matrix. When C2 has been decremented to zero, AND 129 will be enabled (note that C1 already contains a zero count) to produce, via line 159, the MEMORY READY signal and to turn off RNML and WNML. Turning off RNML will, via line 140 and inverter 142 cause all of the memory cells to be put into their HOLD condition (see FIG. 5).

For case number 3 mentioned above, the intiial comparison in the SCUs will result in a NO MATCH signal on line 130 being transferred through OR 131 to turn on RNML. This will initiate downward shifting in loop L1 of the matrices (with simultaneous incrementation of C1) until the desired word is in the bottom rows of the matrices. When one of the RCUs detects a row address match, the MATCH signal on line 128 will terminate downward shifting and will also, via line 125 and OR 126 cause WCU to perform a word address comparison. In this case, the word address comparison results in a MATCH signal on line 127. This MATCH signal on line 127 will make the requested word available to the using unit and will also result in initiating upward shifting in loops L2 and L5 with simultaneous decrementation of C1. When C1 has been decremented to zero, AND 129 will be energized (MATCH line 127 is up and C2 still contains a zero count) to produce a signal on line 159 to raise MEMORY READY and to turn off RNML thereby restoring all of the cells in the matrices to their HOLD condition.

The fourth case mentioned above will occur when the requested word is already located in the access cells X (that is, when there are two sequential requests for the same word). In this case, the initial comparison in RCUs will result in a MATCH signal on line 128. This signal, via line 125 and OR 126 will initiate a comparison in WCU which comparison will also result in a MATCH signal on line 127. The MATCH signal 127 will, through line 104, make the requested word available to the using unit and will also energize AND 129 (both C1 and C2 contain zero counts) to raise the MEMORY READY line. Both latches RNML and WNML will remain in their off condition.

ADDITIONAL MODIFICATIONS

Many modifications, in addition to those discussed above, may be made to the embodiments of the invention that have been described herein. It will be understood that the following discussion of various modifications is presented herein by way of examples and not by way of limitation upon the number and type of modifications that may be made.

Although the embodiments of the invention described above utilize for the memory cells a cell which is normally utilized in "shift register" memories, the shifting memory matrices may be constructed of any suitable memory cell from which and into which data can be shifted. For example, a bubble memory wherein bits of data are stored in the form of magnetic bubbles, and wherein data may be shifted among the cells through the application of magnetic fields, could also be used. Although the general principles would still be the same, an implementation of this invention using magnetic bubble memory matrices would involve various changes to many of the details described above. For example, with respect to the embodiment described above with respect to FIGS. 2, 4 and 5, when the bottom row of the matrix is being shifted to the left (loop L3) or to the right (loop L4) the bubble memory embodiment would preferably shift all data to the left and to the right in unison therewith. Since the number of right shifts is equal to the number of left shifts, after left and right shifting are completed all of the data in the Z cells would have returned to the position that it occupied prior to the left and right shifting. If the matrix is permitted to shift in this manner, it will not be necessary to block the magnetic field which causes left and right shifting from affecting the Z cells. Of course, when using this technique, a Shift Control Unit such as the one shown in FIG. 6 (which permitted shifting in loops L2 and L4 to occur simultaneously) would not be used. Also, the alternative embodiment described with respect to FIGS. 7, 8 and 9 would not be used.

Another modification to the invention could utilize uni-directional shift cells instead of the bi-directional cells described above. In such an embodiment, a "backward" shift of *b* positions would be accomplished in any given row or column by shifting "forward" *n-b* positions where *n* is the length of the row of column being shifted. If one were to use uni-directional shift cells to implement the embodiment shown in FIGS. 7, 8 and 9, it would also be necessary, when shifting upward, to inhibit the first shift pulse from affecting the column which contains the X cell (while allowing the first pulse to cause a single shift in all of the other columns) because the reverse shift loop (L2 in FIG. 7) is shorter in that column than are the reverse shift loops (L5 in FIG. 7) in the other columns. A similar technique may be used even when bi-directional shifting is available. If the "forward" (that is, down or left) shifting required more than *n*/2 shifts, then the "reverse" shifts required for reordering could more quickly be accomplished by "forward" shifting as described in this paragraph. Again, the first "forward" shift pulse which is used to accomplish "reverse" shifting would need to be inhibited from affecting any column or row which was shorter than the other columns or rows being shifted.

From the previous descriptions, those skilled in the art will recognize that this invention can easily be extended to three-dimensional (or, more generally, n-dimensional dynamic ordering. For the three-dimensional case, consider a memory system comprising a plurality of memory modules such as was described with respect to FIGS. 2, 4 and 5. Then after a memory access request, when "sectors" are shifted downward towards the bottom of the matrices, one would cause all of the matrices in the plurality of memory modules to shift downward in unison. When the requested word reaches the bottom row of its associated matrices, the bottom rows of all of the matrices in all of the memory modules would comprise a two-dimensional memory plane which contains the desired word. Proper memory cell interconnections and phase control signals could be provided in accordance with the descriptions contained herein to then subject this two-dimensional plane to dynamic reordering in the manner described above. After this two-dimensional ordering (or in parallel therewith) the other planes in the memory system could also be reordered by shifting them "upward" in appropriate shift loops. After all of the shifting has been completed, the bits of the accessed word will be located in access cells, a one-dimensional "sector" containing the accessed word will be along one "edge" (an "edge" which includes the access cell) of the three-dimensional memory, and the "plane" which includes the accessed word (and its associated "sector") will be at the "bottom" of the memory. Thus, at any given time, all of the "planes" from which a word has been accessed will be ordered by recency of access with the most recent being closest to the "bottom" of the memory; within each "plane" each "sector" from which a word has been accessed will be ordered within the plane in sequence according to recency of access with the most recent being closest to the edge of the plane from which access is achieved; and, within each "sector," all words that have been accessed will be ordered in accordance with recency of access with the most recent being closest to the end of the sector from which access is achieved. This idea can be extended further to four, and more, "dimensional" memory systems. Also, an n-dimensional memory system could be implemented, if desired, utilizing the second embodiment of the invention described with respect to FIGS. 7, 8 and 9 to build a memory system wherein the integrity of "planes" and/or "sectors" is not necessarily retained.

Still another embodiment of the invention could utilize "double-ordering" as is described and claimed in copending application Ser. No. 307,258 filed Nov. 16, 1972 by D.T. Brown entitled Dynamically Double Ordered Shift Register Memory whereby, when accessing data, the memory cells are shifted in the direction which will tend to minimize the total number of shifts required. When using double-ordering, one could use a single access cell and, when accessing data, shift in the direction which will most quickly bring the data into access position. If double-ordering were to be used with the first embodiment described in detail above, it would preferably be implemented in such a manner that odd addresses always are accessed by shifting in one direction while even addresses are accessed by shifting in the opposite direction. Double-ordering, when applied to any of the examples discussed heretofore, can result in a fifty per cent improvement in worst-case access time and would generally substantially improve average access times. Similarly, the use of more than one access cell could improve both worst-case and average access times. However the use of more than one access cell would entail increased complexity and expense of implementation.

Another change to the embodiments described above relates to the manner in which down and left shifts are counted in order to insure an equal number of up and right shifts when the matrices are reordered. To accomplish this, the counting mechanisms described above could be replaced by, for example, shift registers utilizing two "flag" bits for detecting completion of reordering. Reference may be made to above-mentioned application Ser. No. 103,201 for a description of an implementation of such flag registers and a manner in which they may be utilized in place of the counters that have been described herein. Also, instead of detecting the accessibility of a requested word through the use of address comparators, one could utilize a directory in which a record is kept of the location of sectors within the matrix and/or of words within sectors. In such an implementation, each memory access request would result in an interrogation of the directory which would supply an output indicating the number of shifts required (and, in some systems, the direction of shifts) for access and for reordering. The directory would be updated each time that the memory is reordered. The directory would, in effect, be an address translation mechanism which converts an address supplied by the using unit into an "address" which defines the number and direction of shifts required for access and for reordering. The directory approach might be of particular value if one were implementing the second embodiment of the invention described above with respect to FIGS. 7, 8 and 9. Also, with respect to that embodiment, a directory could be utilized in a system wherein, in order to maintain the logical meaning of a "sector address," one were to actually change the addresses of words as they migrated between rows. A directory could be utilized for address translation to convert "old" addresses supplied by the using unit into "new" addresses that are reassigned by the memory system. However, such an implementation would, in most cases, substantially increase the possibility of system error and is therefore not preferred.

Although no mention has been made above of error detection or correction, it will be clear to those skilled in the art that the data matrices will generally include error detection (for example, parity) bits or bits which would supply an error correction capability. Since addresses are also stored in the matrices, error detection or error correction bits would preferably also be utilized to check the address bits themselves. As a further check on system operation, the mechanism which keeps track of shifts in the various directions could be implemented in such a manner that, when searching for a requested word, if all of the rows (or all of the words in a row) are shifted past the detecting mechanism without finding the requested row (or the requested word within a row), a signal will be generated to indicate to the system that the requested word (or row) appears not to be in the memory. This signal would generally indicate either that the memory had not been entirely loaded or that there is an addressing error.

Those skilled in the art will also recognize that a large memory system could easily be constructed of a plurality of modules such as those described herein. In such a system, one could, for example, utilize the address bits supplied by the using unit to select one of the modules for access or, as a further example, in response to a memory access request all of the modules could be shifted in unison until the desired sector is detected in one of them and then, during reordering, the modules from which a word was not accessed would return to their original conditions.

Also, it is not necessary that the number of words within a sector or the number of sectors within a matrix be an integral power of 2. However, when implementing this invention in accordance with the first embodiment described in detail above, it will be highly desirable to assign addresses in such a manner that each sector has a unique sector address.

It will also be recognized that it is not absolutely essential (although it is highly desirable) that words be distributed among the matrices in such a manner that each matrix contains only one bit of a given word. The memory system could be designed in such a manner that, for example, two bits from each word are stored (preferably in adjacent positions) in a matrix. Although implementation would be more complex than has been described herein, the dynamic ordering provided by this invention could be utilized in such a system. Also, memory accesses need not always be for an entire "word." For example a portion of a word, such as a byte of data could be accessed rather than the entire word.

While the invention has been particularly shown and described with reference to preferred embodiments thereof, it will be understood by those skilled in the art that the above and other changes in form and details may be made therein without departing from the spirit and scope of the invention.

What is claimed is:

1. A storage unit for storing representations of words of data which comprises:

a plurality of shiftable memory matrices for storing said representations in related positions, a group of related positions containing the representations constituting a word, each matrix including an access position wherein bits of the word are accessible to a using unit;

means for shifting pluralities of said groups in a first dimension from position to position in each of said matrices in first shift loops which include positions in each of said matrices which comprise an access row which includes said access position, and for shifting pluralities of said groups in said first dimension from position to position in said matrices in second shift loops each of which excludes said access position;

row addressing means for providing manifestations of address bits for identifying a row which contains a word requested by said using unit;
row detection means for detecting the presence in said access row of a requested word;
means for shifting a plurality of said groups in a second dimension from position to position in said access rows in third shift loops which include said access position and in fourth shift loops which exclude said access position;
word addressing means for providing manifestations of address bits of a word requested by said using unit;
means for enabling access to said requested word while its representations are in said access positions; and
shift control means for controlling the shifting in said respective shift loops so that words recently accessed are maintained in positions for successive shifting into said access positions substantially in a sequence based upon recency of usage.

2. A storage unit according to claim 1 wherein:
said shift control means is arranged to terminate shifting in said first loops and to initiate shifting in said third loops when a requested word is shifted into said access row.

3. A storage unit according to claim 2 wherein:
one of said second loops comprises, in a column of said matrix which includes said access position, bit positions excluding said access position; and
others of said second loops each comprises, in a column of said matrix which includes a bit position of said access row other than said access position, bit positions including one bit position of said access row.

4. A storage unit according to claim 2 wherein:
said shift control means is arranged to terminate shifting in said third loops and to initiate shifting simultaneously in said second and fourth loops when a requested word is shifted into said access position.

5. A storage unit according to claim 4 wherein said shift control means is arranged to:
terminate shifting in said second loops when the number of shifts in said second loops is equal to the number of shifts that took place in said first loops, and
terminate shifting in said fourth loops when the number of shifts in said fourth loops is equal to the number of shifts that took place in said third loops.

6. A storage unit according to claim 2 wherein:
said shift control means is arranged to terminate shifting in said third loops and to initiate shifting in said fourth loops when a requested word is shifted into said access position.

7. A storage unit according to claim 6 wherein:
said shift control means is arranged to terminate shifting in said fourth loops and to initiate shifting in said second loops when the number of shifts in said fourth loops is equal to the number of shifts that took place in said third loops.

8. A storage unit according to claim 7 wherein:
said shift control means is arranged to terminate shifting in said second loops when the number of shifts in said second loops is equal to the number of shifts that took place in said first loops.

9. A storage unit for storing representations of words of data which comprises:
a plurality of shiftable memory matrices for storing said representations in related positions, a group of related positions containing the representations constituting a word, each matrix including an access position wherein the bits of the word are accessible to a using unit;
means for shifting sectors each comprising a plurality of words in a first dimension from position to position in each of said matrices in first shift loops which include positions in each of said matrices which comprise an access row which includes said access position, and for shifting said sectors in said first dimension from position to position in said matrices in said second shift loops each of which excludes positions in said access row;
sector addressing means for providing manifestations of address bits for identifying a requested sector which contains a word requested by said using unit;
sector detection means for detecting the presence in said access row of said requested sector;
means for shifting words within said requested sector in a second dimension from position to position in said access rows in third shift loops which include said access position and in fourth shift loops which exclude said access position;
word addressing means for providing manifestations of address bits of a word requested by said using unit;
word detection means for detecting the presence in said access position of a requested word;
means for enabling access to said requested word while its representations are in said access positions; and
shift control means for controlling the shifting in said respective shift loops so that sectors recently accessed are maintained in rows for successive shifting into said access rows on a priority based upon recency of usage and, within each accessed sector, words recently accessed are maintained in positions for successive shifting into said access positions on a priority based upon recency of usage when a given sector is in the access row.

10. A storage unit according to claim 9 wherein:
said shift control means is arranged to terminate shifting in said first loops and to initiate shifting in said third loops when a requested sector is shifted into said access row.

11. A storage unit according to claim 10 wherein:
said shift control means is arranged to terminate shifting in said third loops and to initiate shifting simultaneously in said second and fourth loops when a requested word is shifted into said access position.

12. A storage unit according to claim 11 wherein said shift control means is arranged to:
terminate shifting in said second loops when the number of shifts in said second loops is equal to the number of shifts that took place in said forst loops; and
terminate shifting in said fourth loops when the number of shifts in said fourth loops is equal to the number of shifts that took place in said third loops.

13. A storage unit according to claim 10 wherein:
said shift control means is arranged to terminate shifting in said third loops and to initiate shifting in said fourth loops when a requested word is shifted into said access position.

14. A storage unit according to claim 13 wherein:

said shift control means is arranged to terminate shifting in said fourth loops when the shifts in said fourth loops have resulted in the word which was in said access positions, after shifting in said first loops and prior to shifting in said third loops, being shifted into the matrix positions adjacent to said access positions.

15. A storage unit according to claim 14 wherein:

said shift control means is arranged to initiate shifting in said second loops when a requested word is shifted into said access positions and to terminate shifting in said second loops when the shifts in said second loops have resulted in the sector which was in said access rows, prior to shifting in said first loops, being shifted into the matrix rows adjacent to said access rows.

16. A storage unit according to claim 13 wherein:

said shift control means is arranged to terminate shifting in said fourth loops when the number of shifts in said fourth loops is qual to the number of shifts that took place in said third loops.

17. A storage unit according to claim 16 wherein:

said shift control means is arranged to initiate shifting in said second loops when shifting in said fourth loops is terminated and to terminate shifting in said second loops when the number of shifts in said second loops is equal to the number of shifts that took place in said first loops.

18. A storage unit according to claim 9 wherein said shift control means comprises:

first and second counting means;

means for incrementing said first counting means each time that a shift is accomplished in said first loops and for decrementing said first counting means each time that a shift is accomplished in second loops;

means for incrementing said second cutting means each time that a shift is accomplished in said third loops and for decrementing said second counting means each time that a shift is accomplished in said fourth loops;

means for terminating shifting in said second loops when said first counting means has been decremented to zero; and means for terminating shifting in said fourth loops when said second counting means has been decremented to zero.

19. A storage unit in accordance with claim 18 wherein each of said counting means comprises a bidirectional shift means.

20. A storage unit for storing representations of words of data which comprises:

a plurality of shiftable memory matrices for storing said representations in related positions, a group of related positions containing the representations constituting a word, each matrix including an access position wherein the bits of the word are accessible to a using unit;

means for shifting sectors, each sector comprising the words in related rows of the matrices, in a first dimension from position to position in each of said matrices in first shift loops which include positions in each of said matrices which comprise an access row which includes said access position, and for shifting pluralities of said groups in said first dimension from position to position in said matrices in second shift loops each of which excludes said access row, said second shift loops being in a direction opposite to that of said first shift loops;

sector addressing means for providing manifestations of sector address bits for identifying a requested sector which contains a word requested by said using unit;

sector detection means for detecting the presence in said access row of said requested sector;

means for shifting words within said requested sector in a second dimension from position to position in said access rows in third shift loops which include said access position and in fourth shift loops which exclude said access position, said fourth shift loops being opposite in direction to said third shift loops;

word addressing means for providing manifestations of address bits of a word requested by said using unit;

word detection means for detecting the presence in said access position of a requested word;

means for enabling access to said requested word while its representations are in said access positions; and shift control means comprising means responsive to said sector detection means for causing shifting in said first loops when said requested sector is not in said access rows, and for terminating shifting in said first loops when said requested sector is in said access rows;

means responsive to said sector detection means and to said word detection means for causing shifting in said third loops when said requested sector is in said access rows but said requested word is not in said access positions, and for terminating shifting in said third loops when said requested word is in said access positions;

means for causing a number of shifts in said fourth loops that is equal to the number of shifts that were accomplished in said third loops; and means for causing a number of shifts in said second loops that is equal to the number of shifts that were accomplished in said first loops;

said shift control means thereby controlling the shifting in said respective shift loops so that sectors most recently accessed are maintained in rows for successive shifting into said access rows in a sequence based upon recency of usage and, within each accessed sector, words most recently accessed are maintained in positions for successive shifting into said access positions in a sequence based upon recency of usage.

21. A storage unit for storing representations of words of data which comprises:

a plurality of shiftable memory matrices for storing said representations in related positions, a group of related positions containing the representations constituting a word, each matrix including an access position wherein the bits of the word are accessible to a using unit;

means for shifting pluralities of said groups in a first dimension from position to position in each of said matrices in first shift loops which include positions in each of said matrices which comprise an access row which includes said access position, and for shifting pluralities of said groups in said first dimension from position to position in said matrices in second shift loops one of which comprises, in a column of said matrix which includes said access position, bit positions excluding said access position and others of which comprise, in columns of said matrix which do not include said access position, bit positions including one bit position of said access row;

row addressing means for providing manifestations of address bits for identifying a row which contains a word requested by said using unit;

row detection means for detecting the presence in said access row of a requested word;

means for shifting a plurality of said groups in a second dimension from position to position in said access rows in third shift loops which include said access position and in fourth shift loops which exclude said access position;

word addressing means for providing manifestations of address bits of a word requested by said using unit;

word detection means for detecting the presence in said access position of a requested word;

means for enabling access to said requested word while its representations are in said access positions; and shift control means for controlling the shifting in said respective shift loops so that words recently accessed are maintained in positions for successive shifting into said access positions substantially on a priority based upon recency of usage.

22. A storage unit according to claim 21 wherein:

said shift control means is arranged to terminate shifting in said first loops and to initiate shifting in said third loops when a requested word is shifted into said access row.

23. A storage unit according to claim 22 wherein:

said shift control means is arranged to terminate shifting in said third loops and to initiate shifting in said fourth loops when a requested word is shifted into said access position.

24. A storage unit according to claim 23 wherein said shift control unit is arranged to:

terminate shifting in said fourth loops and initiate shifting in said second loops when the shifts in said fourth loops have resulted in the word that was in said access positions, after shifting in said first loops and prior to shifting in said third loops, being shifted into the matrix positions adjacent to said access positions; and terminate shifting in said second loops when the shifts in second loops have resulted in the word that was in said access positions, prior to shifting in said first loops, being shifted into the matrix row adjacent to said access row.

25. A storage unit according to claim 23 wherein said shift control means is arranged to:

terminate shifting in said fourth loops and to initiate shifting in said second loops when the number of shifts in said fourth loops is equal to the number of shifts that took place in said third loops, and terminate shifting in said second loops when the number of shifts in said second loops is equal to the number of shifts that took place in said first loops.

* * * * *

UNITED STATES PATENT OFFICE
CERTIFICATE OF CORRECTION

Patent No. 3,766,534 Dated October 16, 1973

Inventor(s) William F. Beausoleil and Byron E. Phelps

It is certified that error appears in the above-identified patent and that said Letters Patent are hereby corrected as shown below:

Column 29, line 40, the word "cutting" should read --counting--.

Signed and sealed this 6th day of August 1974.

(SEAL)
Attest:

McCOY M. GIBSON, JR.
Attesting Officer

C. MARSHALL DANN
Commissioner of Patents